US008359821B2

(12) United States Patent
Park

(10) Patent No.: US 8,359,821 B2
(45) Date of Patent: Jan. 29, 2013

(54) ADJUSTING DEVICE FOR ADJUSTING THE HEIGHT OF A LAWN CARE APPARATUS

(75) Inventor: Keith Park, York (GB)

(73) Assignee: Chervon (HK) Limited, Hong Kong (HK)

( * ) Notice: Subject to any disclaimer, the term of this patent is extended or adjusted under 35 U.S.C. 154(b) by 0 days.

(21) Appl. No.: 13/150,413

(22) Filed: Jun. 1, 2011

(65) Prior Publication Data
US 2011/0302895 A1   Dec. 15, 2011

(30) Foreign Application Priority Data

Jun. 9, 2010   (CN) .......................... 2010 1 0199742
Sep. 4, 2010   (CN) .......................... 2010 1 0281181

(51) Int. Cl.
A01D 34/00   (2006.01)
(52) U.S. Cl. .......................... 56/17.1; 56/17.2
(58) Field of Classification Search .................. 56/17.2, 56/15.9, 15.8, 15.2, 320.1, DIG. 3, DIG. 22, 56/14.9; 280/43.21, 43.23, 43.13
See application file for complete search history.

(56) References Cited

U.S. PATENT DOCUMENTS

| 2,529,870 | A | * | 11/1950 | Golasky | 56/17.2 |
| 3,063,226 | A | * | 11/1962 | Pfauser | 56/15.3 |
| 3,114,229 | A | * | 12/1963 | Wilson | 56/11.8 |
| 3,161,006 | A | * | 12/1964 | Willette et al. | 56/17.2 |
| 3,269,100 | A | * | 8/1966 | Smith | 56/17.2 |
| 3,570,227 | A | * | 3/1971 | Bellinger | 56/10.2 A |
| 3,677,574 | A | * | 7/1972 | Cyr | 280/43.13 |
| 3,706,186 | A | * | 12/1972 | Hurlburt et al. | 56/15.8 |
| 4,006,580 | A | * | 2/1977 | Kalleicher | 56/17.2 |
| 4,077,191 | A | * | 3/1978 | Pittinger et al. | 56/12.7 |
| 4,307,561 | A | * | 12/1981 | Hicks | 56/15.9 |
| 4,441,306 | A | * | 4/1984 | Kuhn | 56/15.9 |
| 4,577,455 | A | * | 3/1986 | Amano et al. | 56/17.1 |
| 4,715,168 | A | * | 12/1987 | Oxley | 56/15.8 |
| 4,835,952 | A | * | 6/1989 | McLane | 56/17.2 |
| 4,962,636 | A | * | 10/1990 | Sampei et al. | 56/17.1 |
| 5,065,568 | A | * | 11/1991 | Braun et al. | 56/14.9 |
| 5,163,274 | A | * | 11/1992 | Burdsall et al. | 56/14.9 |
| 5,203,151 | A | * | 4/1993 | Mills | 56/17.2 |
| 5,230,208 | A | * | 7/1993 | Hess et al. | 56/17.2 |
| 5,351,467 | A | * | 10/1994 | Trefz et al. | 56/16.3 |
| 5,507,137 | A | * | 4/1996 | Norris | 56/10.2 J |
| 5,526,633 | A |   | 6/1996 | Strong et al. |   |
| 5,797,252 | A | * | 8/1998 | Goman | 56/17.2 |
| 6,023,921 | A | * | 2/2000 | Burns et al. | 56/16.3 |
| 6,212,863 | B1 | * | 4/2001 | Thomas | 56/17.2 |
| 6,339,918 | B1 | * | 1/2002 | Thomas | 56/17.2 |
| 6,606,845 | B1 | * | 8/2003 | Spies | 56/16.7 |
| 7,121,073 | B2 | * | 10/2006 | Schmidt et al. | 56/249 |
| 7,146,786 | B2 | * | 12/2006 | Brandon | 56/14.9 |

(Continued)

FOREIGN PATENT DOCUMENTS
WO   2009/094449 A1   7/2009

Primary Examiner — Arpad Fabian-Kovacs
(74) Attorney, Agent, or Firm — Greenberg Traurig, LLP

(57) ABSTRACT

An apparatus, such as a lawnmower, includes a cutting device and a chassis for carrying the cutting device. The chassis includes a chassis body, at least one front wheel and at least one rear wheel mounted on the chassis body. An adjusting device for adjusting the height of the cutting device with respect to the chassis, is arranged between the cutting device and the chassis. The adjusting device includes an adjusting seat, an adjustment driving device mounted, a driving member, and a driven member connected to the other one of the chassis body and the cutting device.

10 Claims, 19 Drawing Sheets

U.S. PATENT DOCUMENTS

| | | | |
|---|---|---|---|
| 7,395,648 B1 * | 7/2008 | Silbernagel et al. | 56/17.2 |
| 7,614,207 B2 * | 11/2009 | Elhardt et al. | 56/17.1 |
| 7,624,560 B1 * | 12/2009 | Humphrey | 56/17.2 |
| 7,716,906 B2 * | 5/2010 | Swart | 56/17.1 |
| 7,770,370 B2 * | 8/2010 | Komorida et al. | 56/17.1 |
| 7,861,502 B1 * | 1/2011 | Benway | 56/17.1 |
| 7,870,710 B2 * | 1/2011 | Koehn | 56/15.9 |
| 7,958,712 B2 * | 6/2011 | Cheung | 56/320.1 |
| 8,001,754 B2 * | 8/2011 | Michel | 56/17.2 |
| 2007/0119137 A1 | 5/2007 | Brandon | |
| 2009/0173052 A1 * | 7/2009 | Swart | 56/15.2 |
| 2009/0183482 A1 * | 7/2009 | Cheung | 56/17.1 |
| 2011/0302893 A1 * | 12/2011 | Park | 56/17.1 |
| 2011/0302894 A1 * | 12/2011 | Park | 56/17.2 |
| 2011/0302899 A1 * | 12/2011 | Park | 56/202 |

* cited by examiner

ADJUSTING DEVICE FOR ADJUSTING THE HEIGHT OF A LAWN CARE APPARATUS

RELATED APPLICATION INFORMATION

This application claims the benefit of CN 201010199742.3, filed Jun. 9, 2010, and CN 201010281181.1, filed on Sep. 4, 2010, the disclosures of which are incorporated herein by reference in their entirety.

BACKGROUND

The subject application generally relates to improvements in apparatuses for caring for a lawn.

Apparatuses for caring for a lawn, such as lawnmowers, are known in the art. Generally, such apparatuses include a cutting device and a chassis for carrying the cutting device. The chassis is provided with wheels for helping the operator to move the apparatus on the lawn and the cutting device is undetachably mounted on the chassis. The chassis is generally heavy and multiple different types of lawnmowers may be needed if the operator would like to use different cutting devices with different performances for different work conditions.

Moreover, in the known apparatuses, a height adjusting device for adjusting the cutting depth is arranged between the cutting device and the chassis. A handle is provided to allow the operator to control the height adjusting device manually. For example, U.S. Pat. No. 5,526,633 discloses an exemplary height adjusting device. These known height adjusting devices are, however, inconvenient for the operator to operate since they need the operator to perform multiple actions to complete a height adjustment operation.

SUMMARY

The following describes an improved apparatus for caring for a lawn, particularly one that provides relatively enhanced portability and maneuverability.

More particularly, the following describes an improved apparatus for caring for a lawn that includes: a cutting device; a chassis for carrying the cutting device, including a chassis body, at least one front wheel and at least one rear wheel mounted on the chassis body; and a handle fixedly connected to the chassis, including a handle body located at the back upper portion of the apparatus; wherein the apparatus has a stable support structure including a body portion of the support deck extending rearwards and upwards from the front wheel to the handle body. With such an arrangement, the apparatus provides a stable support structure for the operator so that the operator can better control movement of the lawn caring apparatus.

While this describes one exemplary feature and advantage that is obtained via the subject apparatus, other features and advantages will be become clearer from the following drawings and descriptions of various preferred embodiments.

BRIEF DESCRIPTION OF THE DRAWINGS

The subject apparatus for caring for a lawn will be described with reference to the following drawings in which.

DETAILED DESCRIPTION

The subject apparatus for caring for a lawn is now described using reference to a lawnmower by way on non-limiting example.

FIGS. 1-4 illustrate a lawnmower 1 constructed according to a first exemplary embodiment. The lawnmower 1 includes a chassis 2 and a cutting device 3.

Figure 1:
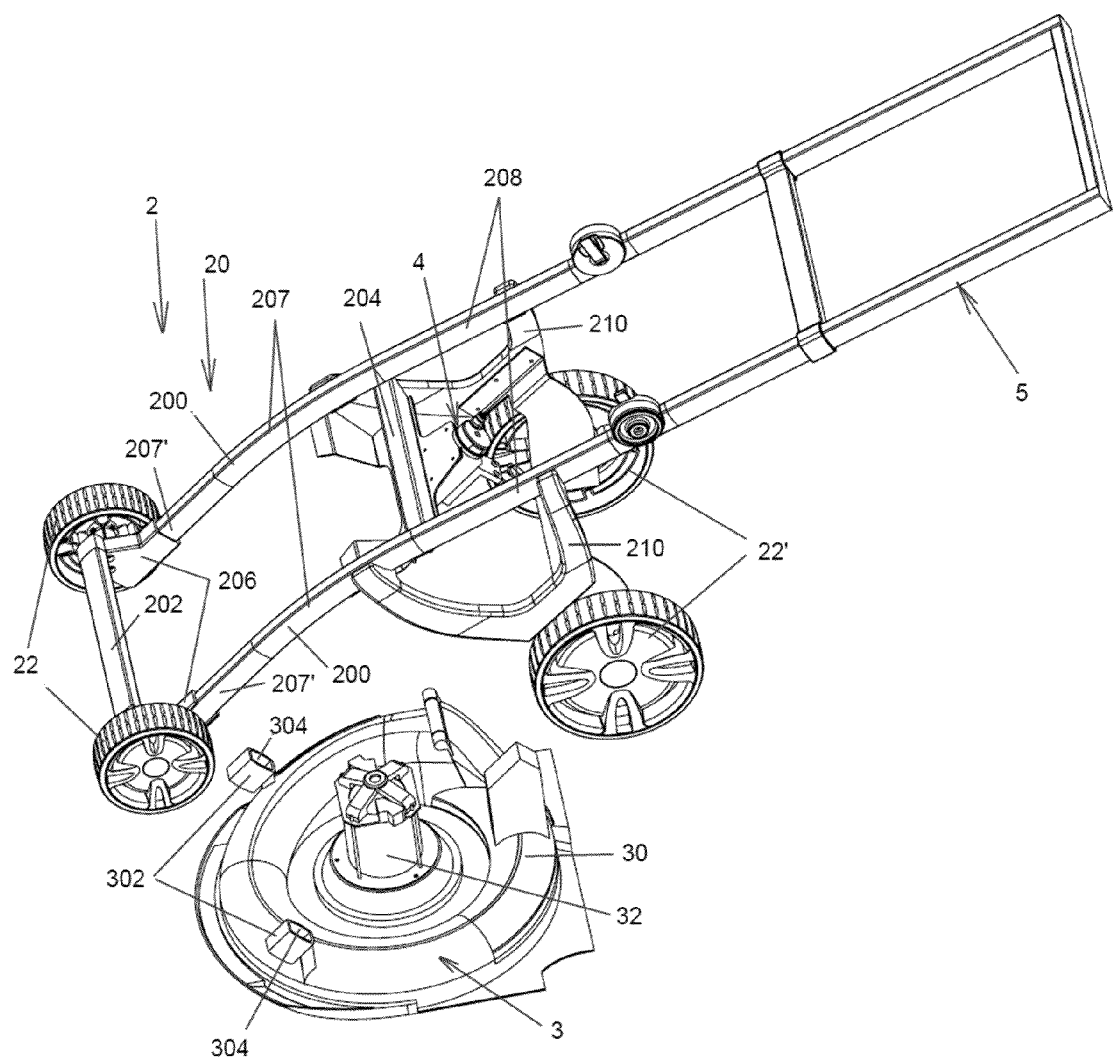
FIG. 1 illustrates an exemplary apparatus for caring for a lawn constructed according to one embodiment of the present invention with the cutting device disengaged with the chassis for clarity.
Figure 2:
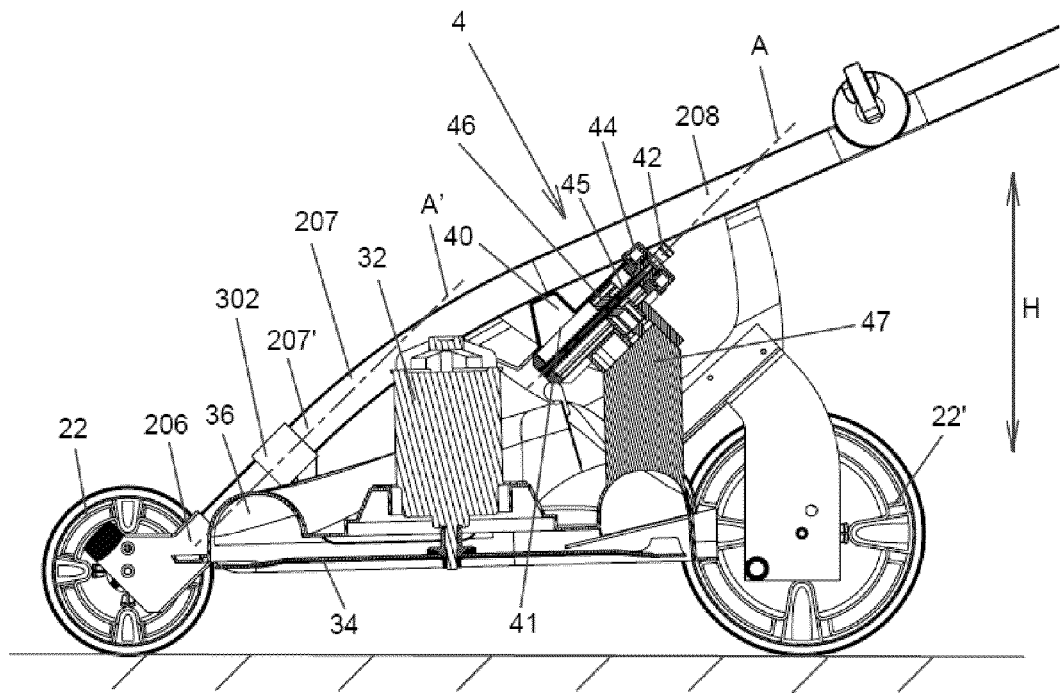
FIG. 2 is a sectional view of the apparatus of FIG. 1 in which the cutting device is in an upper position.

As shown in FIGS. 1 and 2, the chassis 2 includes a chassis body 20 in the form of a frame structure. The chassis body 20 includes two side frames 200, a front rod 202, and a rear rod 204 which may preferably be straight rods positioned between the two side frames 200 to connect the two side frames 200 together. Each side frame has a front portion 206 and a rear portion 208. As shown in FIG. 2, when the chassis 2 is positioned in a plane, the rear portion 208 of the side frame 200 is higher than the front portion 206 so that a space for accommodating the cutting device 3 is formed below the chassis 2. A front wheel 22 may be rotatably connected to the front portion 206 of the chassis body 20 directly or indirectly, and a rear wheel 22' may be rotatably connected to a connecting member 210 positioned on the rear portion 208 of the chassis body 20 directly or indirectly. Preferably, two front and two rear wheels are provided, and the connecting members 210 are V-shaped, two ends of each being fixed to or formed on the rear portions 208 of the side frames 200. Alternatively, in other embodiments, the number of the front or rear wheels may be different, for example, the total number of the front wheels and the rear wheels is three or more; the front rod and the rear rod as the connecting rods between the two side frames may be formed with other appropriate shapes and structures and need not be limited to being straight and elongated rods, and one or more connecting rods may be alternatively provided between the two side frames (not limited to the front or rear portion of the side frame); the connecting rods between the side frames and the rear wheels may also be formed in other appropriate shapes and structures and need not be limited to a V-shape.

Figure 37:
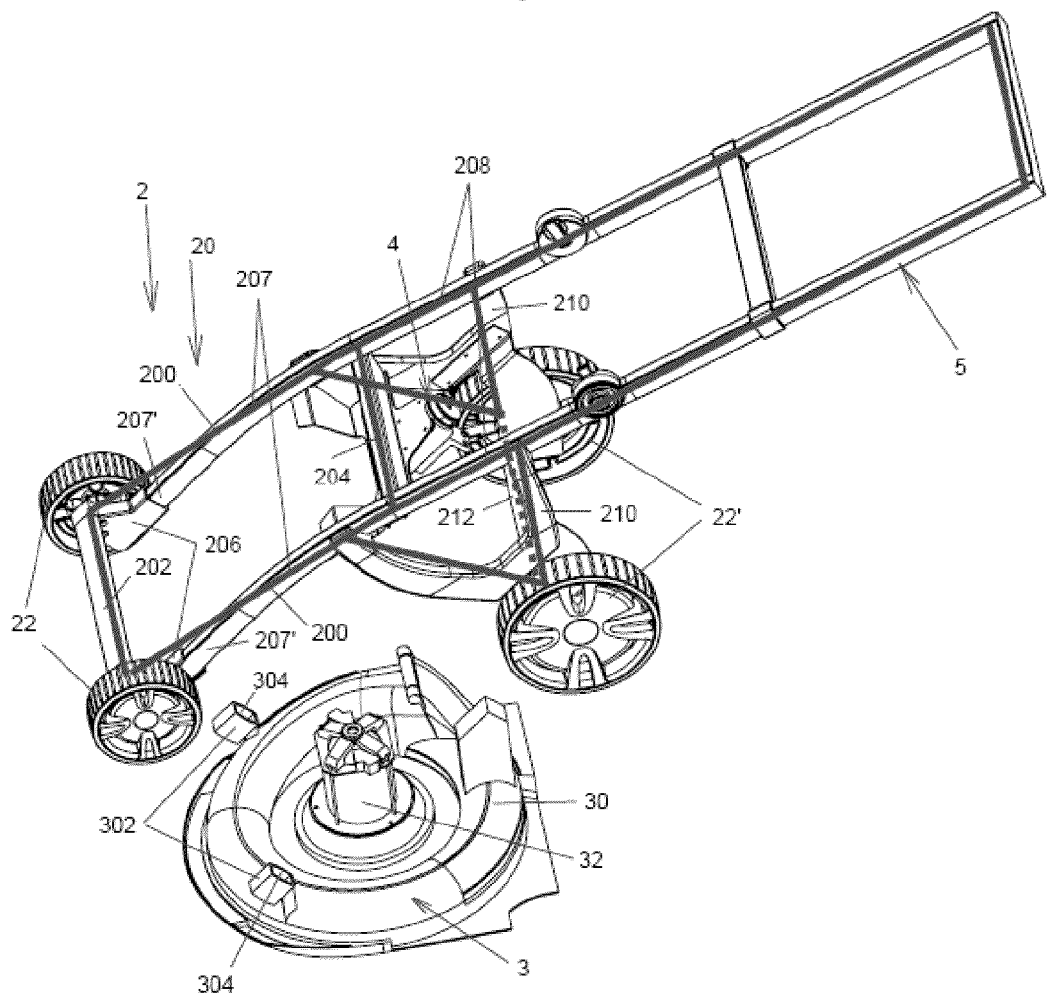
FIG. 37 illustrates a first embodiment of a stable support of the lawnmower according to the present invention.

Referring to FIGS. 1, 2 and 37, the lawnmower 1 further comprises a handle 5 with a handling body 51 extending along a width direction of the lawnmower. The handling body 51 of the handle 5 is fixedly connected to the chassis body 20 via handle connecting portions 53 in a height direction of the lawnmower. This kind of fixed connection may be unreleasable connection, or may be releasable connection as described in the following description. As one of the advantages of the lawn mower according to the present invention, the present invention provides a stable integral support for the lawnmower. FIG. 37 shows a first embodiment of the stable support of the lawn mower according to the present invention. Referring to the thick lines containing the solid lines and dot lines in FIG. 37, wherein those indicated by the dot lines in FIG. 37 means being covered by the other parts of the lawnmower, the side frames 200, the front rod 202, the rear rod 204, the two connecting members 210 of the chassis 2 of the lawnmower, the handle connecting portions 53, and the handling body 51 combine together to form a stable support structure in which the front and rear portions have relatively stable position. Each connecting member 210 has an upper end connecting to one of the side frame 200 and a lower end connecting to one of the rear wheels 22'. A support rod 212 connects between the two rear wheels 22'. As well known for those ordinary skilled in the art, the main weight of the lawnmower may be born by the front wheels, the rear wheels and the structure connecting the front and rear wheels in the cutting process. When it needs the operator to lift the rear wheel of the lawnmower upwards by gripping the handle while the operator stands behind the handle, the weight of the lawnmower is substantially completely carried by the support structure, which may be a terrible challenge for the support structure of the lawnmower. In the prior art, a support structure of a lawnmower is formed by connecting a handle with a chassis positioned under the power cutting device of the lawnmower near rear wheels, thus when lifting the rear wheel, connecting portions between the chassis and the handle and near the rear wheels may be deformed largely so that the connecting portions between the chassis and the handle to tend to rupture and damage; moreover, it is hard for the operator to press the handle downwards to turn up a front portion of the lawnmower around the rear wheels which needs to take much more strength. However, in the support structure of the lawnmower of according to the present invention, the main portion, that is the handle connecting portions and the side frames, of support structure between the handling body 5 of the handle and the front wheels 22 extends obliquely rearwards and upwards from the front wheels substantially in a straight line, so that no matter the operator grips the handling body 51 to lift the rear wheel upwards or turn up the front wheel, the forces applied to the portions between the handling body 5 of the handle and the front wheel 22 are generally equal without sections with large local stress difference formed, thus it ensures that no weak sections tends to possibly rupture. Moreover, the connecting portion 210 with a V shape also provides a more stable support between the side frames and the rear wheels.

Figure 38:
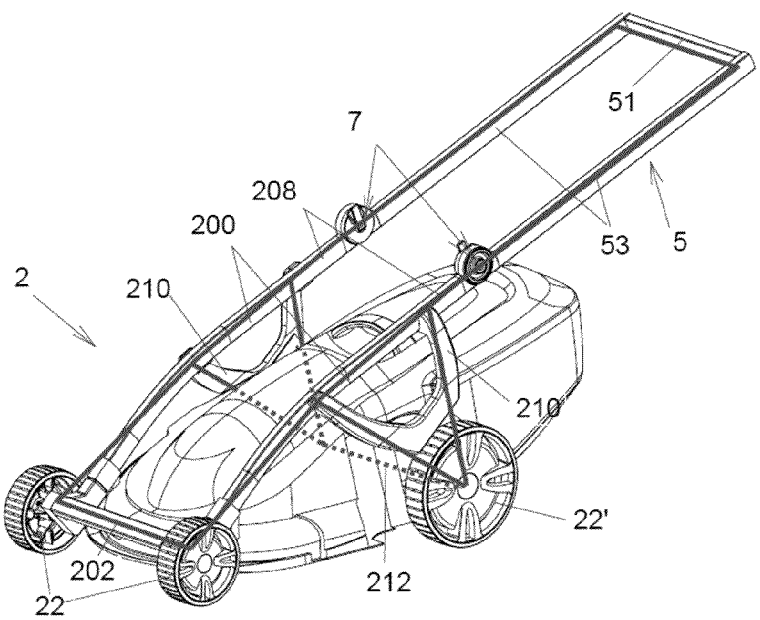
FIG. 38 illustrates a second embodiment of the stable support of the lawnmower according to the present invention.

FIG. 38 shows a second embodiment of the stable support of the lawn mower according to the present invention, which has a difference to the first embodiment of the stable support shown in FIG. 37 that the rear rod 204 between the two side frames is removed.

Figure 39:
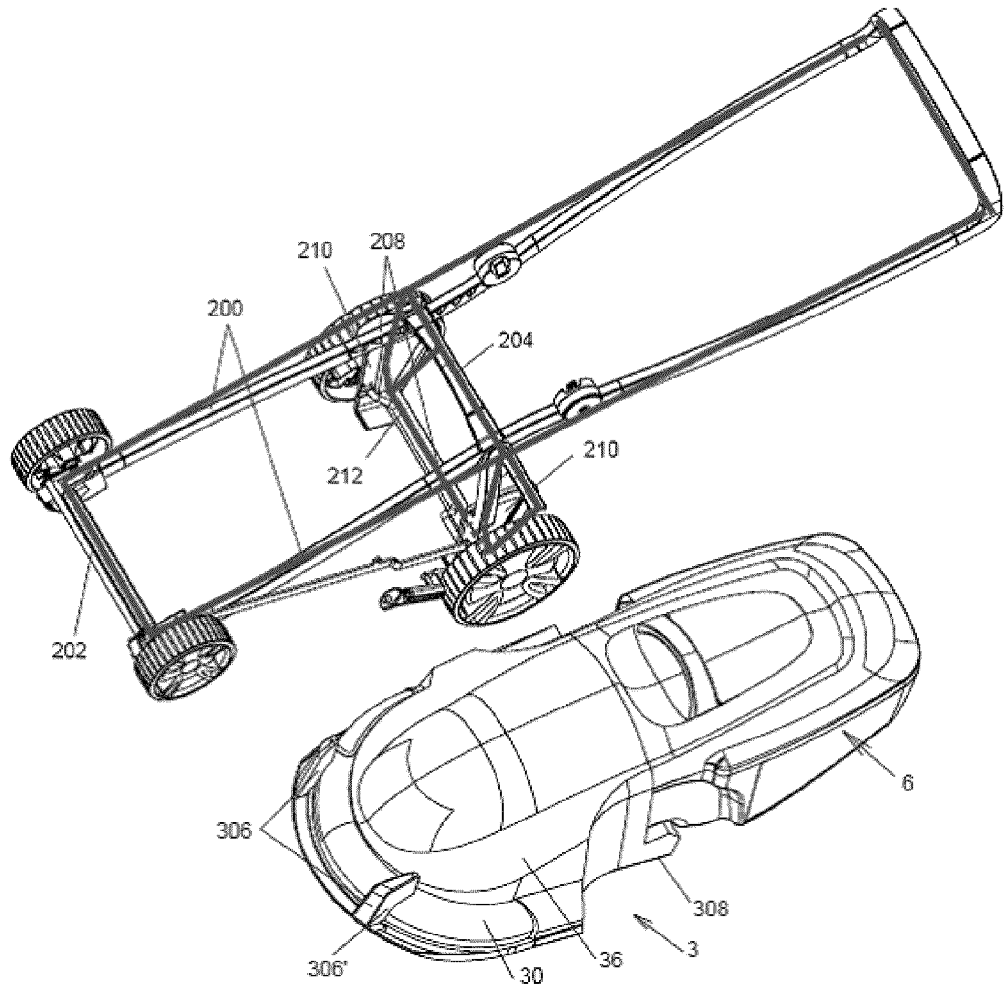
FIG. 39 illustrates a third embodiment of the stable support of the lawnmower according to the present invention.

FIG. 39 shows a third embodiment of the stable support of the lawn mower according to the present invention, which has a difference to the first embodiment of the stable support shown in FIG. 37 that the connecting member 210 is differently shaped.

The cutting device 3 includes a support deck 30 for supporting the power source, an electric motor 32 mounted on the support deck 30, and a cutting blade 34 directly mounted on an output shaft of the motor 32. Preferably, the support deck 30 includes a volute or arched grass displacing channel 36 so as to allow cut grass to pass and be guided into the grass collector or displaced out of the lawnmower. The members forming the grass displacing channel and the other parts of the support deck may be formed integrally, or assembled by different members. In use, the motor 32 drives the cutting blade 34 to rotate around a vertically oriented axis to complete the cutting. The general person skilled in the art may appreciate that in the other embodiments, alternatively, the electric motor as the power source may be replaced by a mini-gas engine, the cutting blade as the cutting member may be replaced by a flexible cutting line or cutting line spool, the output shaft of the power source and the cutting member may be indirectly connected by a deceleration transmission mechanism, and the support deck of the power source may also be separated from the members forming the cut grass guiding channel.

The support deck 30 of the power source also includes a connecting means for connecting the support deck 30 and the chassis body 20. In a first embodiment, the connecting means takes the form of two sleeves which are formed on the front top portion of the support deck 30, such as a sleeve 302 having an opening 304 respectively. Each side frame 200 includes a middle portion 207, the front end 207' of which is releasably connected to the front portion 206 of the side frame. In the first embodiment, the front portion 206 has a C-shaped section, and the front end 207' of the middle portion 207 is inserted into the front portion 206, and is releasably secured into the front portion 206. Once the front end 207' of the middle portion 207 of the side frame 200 is released from the front portion 206, and inserted into the opening 304 of the sleeve 302 of the support deck 30, and then the front end 207' of the middle portion 207 of the side frame 200 is connected or secured to the front portion 206 of the side frame, the cutting device 3 may be mounted to the chassis body 20 of the chassis 2, so the chassis 2 may move on the lawn while carrying the cutting device 3. In the other embodiments, the support deck of the cutting device may be connected to the chassis by other connecting mechanisms.

Compared to a chassis in which the cutting device is fixedly attached, the frame-type chassis of the subject lawnmower has a simpler structure, saves in materials, decreases weight, and reduces cost, and one chassis may be used to adapt the lawnmower with cutting devices with different performances and configurations thus providing a universal platform adapted to different cutting devices thereby further reducing the cost associated with a user needing to have lawnmowers with different performances for adapting to more work conditions.

An adjusting device 4 is arranged between the chassis 2 and the cutting device 3, which is used for adjusting the height of the cutting device 3 with regard to the chassis 2, thereby adjusting the grass cutting height. The adjusting device 4 includes an adjusting seat 40, an adjustment driving device mounted on the adjusting seat 40, a driving member driven by the adjustment driving device, and a driven member which is connected to the driving member and displaces in the height direction with the movement of the driving member. In a first embodiment, the adjusting device includes a motor 42, a pinion gear 43 positioned on the output shaft of the motor 42 and a large gear 44 which is connected to the driving member and engages with the pinion gear 43. The driving member takes the form of a screw 45, and the driven member takes the form of a driven block formed with a threaded opening having internal thread which may be engaged with the thread of the screw. When the motor 42 is started, and the screw 45 rotates around its central axis A under the transmission of the gears 43 and 44, the driven block 46 moves along the screw 45 in the direction of the axis A, thereby driving the driven block 46 to displace in the height direction H. Obviously, the rotating axis of the driven block coincides with the axis A of the screw 45. The person skilled in the art may obviously appreciate that alternatively, the driving member may be a driving block with internal threads, and the driven member may be a screw with external threads which may be engaged with the internal threads of the driving member.

In a preferred embodiment, the adjusting seat 40 is connected to the chassis body 20 by screws or the like. The driven member 46 is mounted on a connecting member 47 which is fixedly connected to or directly formed on the support deck 30 of the cutting device 3. With this arrangement, when the motor 42 is started, the cutting device 3 moves along with the driven block 46 in the direction of axis A so as to displace in the height direction H, thereby completing the height adjustment of the cutting member so as to adjust the grass cutting depth. Any height adjustment in the moving area of the driven member may be achieved by controlling the motor.

In the process of the height adjustment, the sleeve 304 of the cutting device 3, which is connected to the middle portion 207 of the side frame of the chassis body, slides on the front end 207' of the middle portion 207 of the side frame in the longitudinal axis A' of the front end 207' of the middle portion 207 of the side frame, so it ensures that the integral cutting device 3 may get a substantially stable support, while the axis A' is parallel to the axis A. For this purpose, at least a portion of the surface of the front end 207' of the middle portion 207 of the side frame extends in the direction parallel to the axis A of the screw, and the sleeve of the support deck of the cutting device is slidably connected to the at least a portion of the surface.

In the other embodiments, the positions of the adjusting seat and the driven member may be interchanged, that is to say, the adjusting seat is connected to the support deck of the cutting device, and the driven member is connected to the chassis body.

The adjusting seat 40 further includes a guide internal surface 41, and the driven block 46 includes a guide external surface 46' which comes into contact with the internal surface 41 to guide the driven block. In the process of the driven block 46 moving along the screw 45, the external surface 46' of the driven block moves along the internal surface 41 of the adjusting seat in the direction parallel to the axis A of the screw all the while, so as to ensure the linear degree of the movement of the driven block, thus the driven block will not be stopped on the screw 45 because of the weight of the cutting device. Preferably, the guide internal surface and the guide external surface are both flat planes, but in the other embodiments, they may be replaced by non flat planes, as long as the extending direction of one of the guide internal surface and the guide external surface is parallel to the axis A of the screw.

Figure 3:
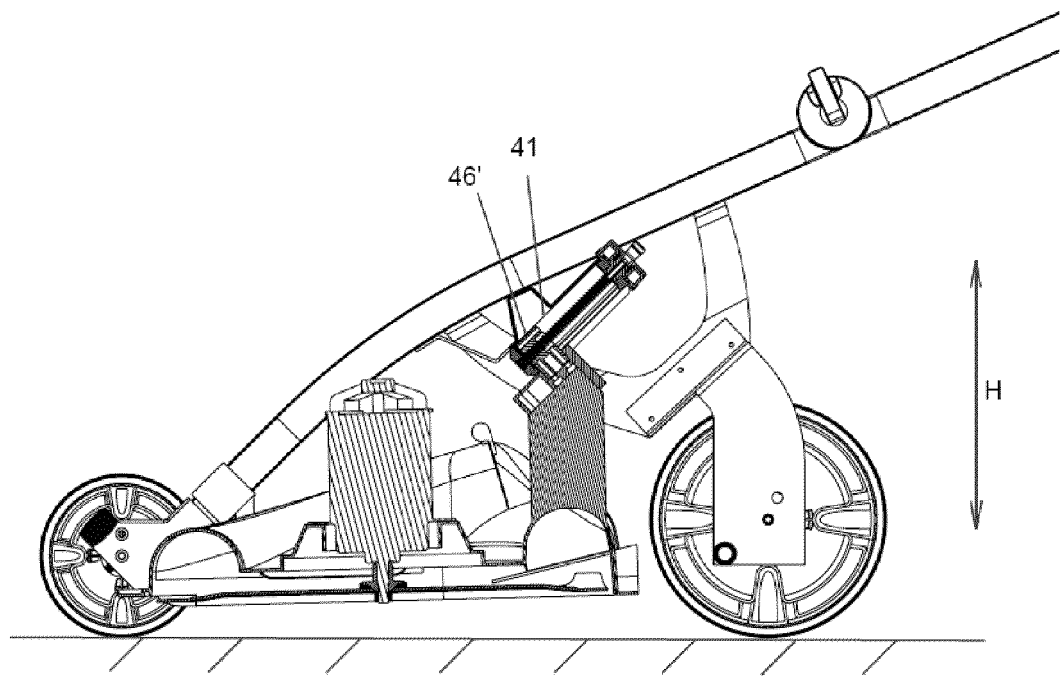
FIG. 3 is a sectional view of the apparatus of FIG. 1 in which the cutting device is in a lower position.
Figure 4:
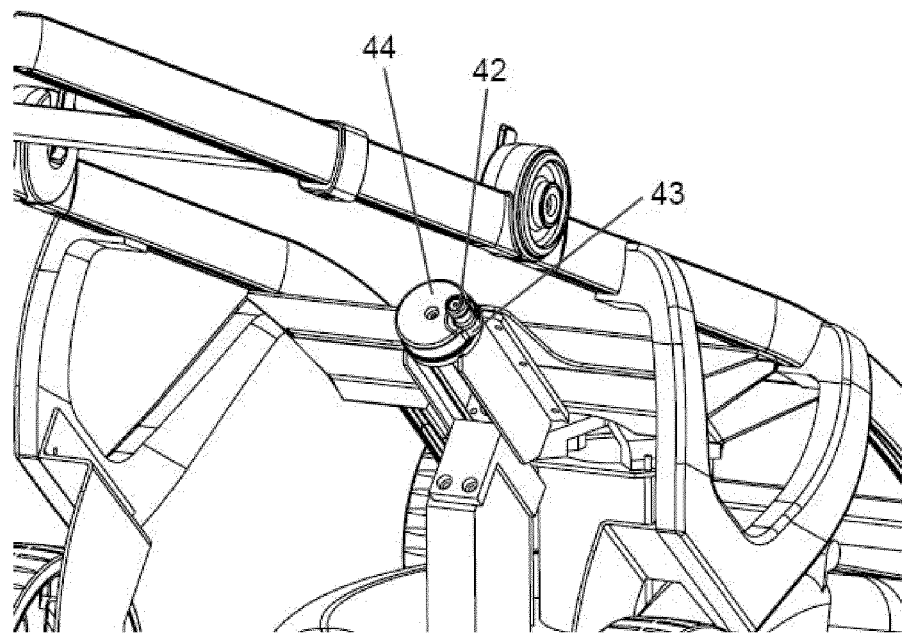
FIG. 4 is a perspective view of a portion of the apparatus of FIG. 1.

FIGS. 2 and 3 show that the cutting device is positioned in a upper position and a lower position with respect to the chassis respectively.

Alternatively, the motor 42 may be supplied power via an alkaline battery, rechargeable battery or AC power source. The control circuit of the motor 42 and the control circuit of the power source of the cutting device may be arranged in the same circuit system, or may be separated from each other.

Alternatively, in the other embodiments, the adjustment driving device may only include a motor, wherein the output shaft of the motor is connected to the driving member directly; or the adjustment driving device may be driven by a motor with linear movement or other appropriate type of power sources; the driving member and the driven member may utilize other transmissions, including: a rotating transmission (while in the rotating transmission, the rotating axes of the driving member and the driven member may be parallel to but not coincide with each other), or a sliding transmission as long as the movement transmitted from the adjustment driving device is converted to the displacement of the driven member in the height direction. The driven member may also be directly connected to the support deck of the cutting device or directly formed on the support deck of the cutting device.

With the adjusting device driven by the power source, the operator can complete the height adjustment without multiple actions, thus the maneuverability of the machine is enhanced.

Figure 5:
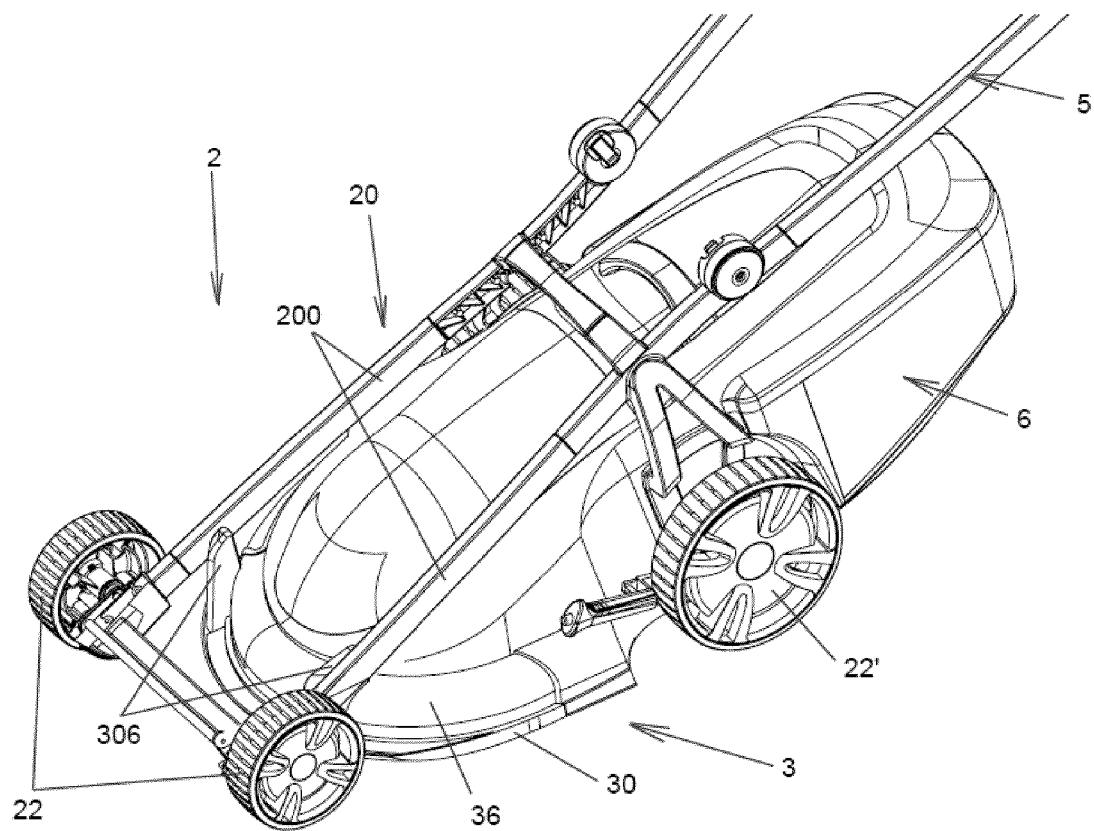
FIGS. 5, 6 and 7 illustrate a second embodiment of a connection mode between a support deck of a cutting device and a chassis of the apparatus.
Figure 6:
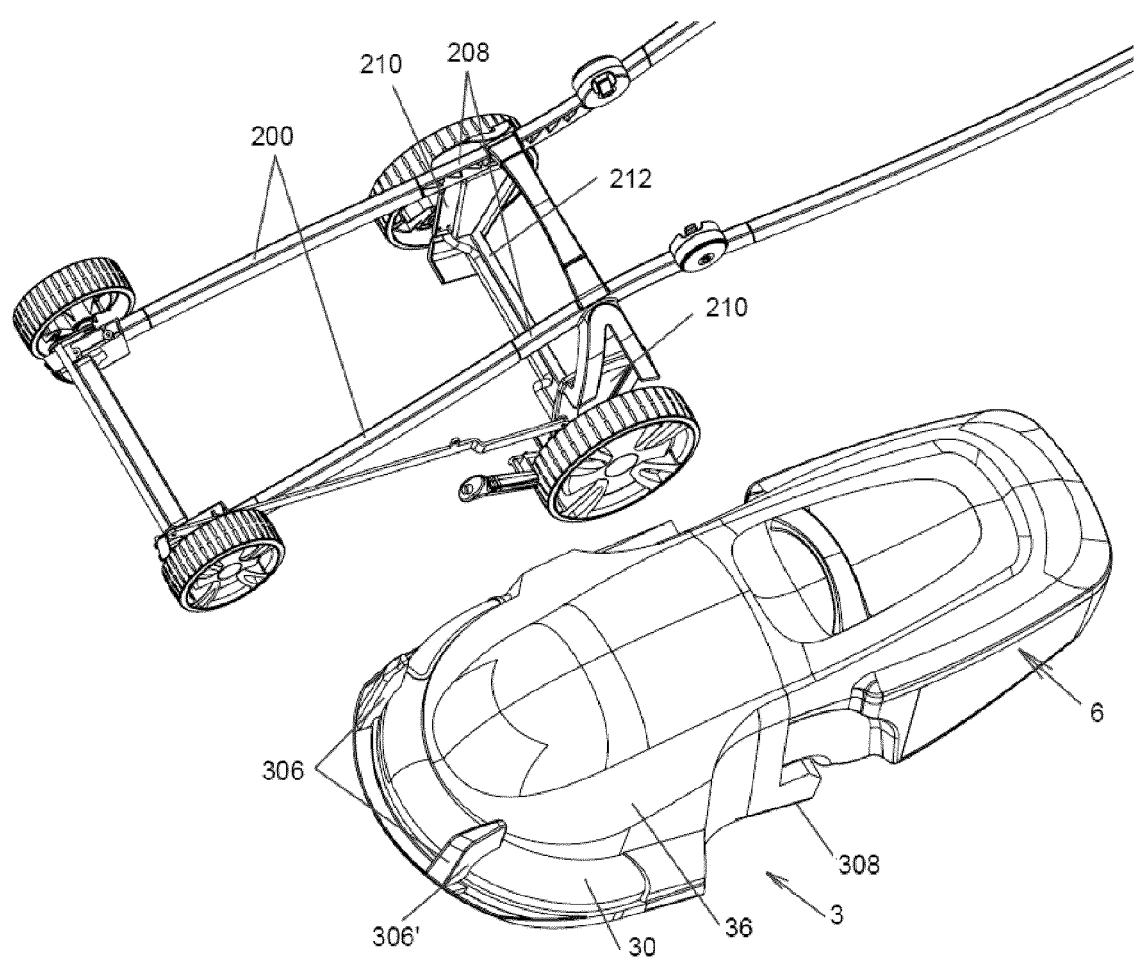
Figure 7:
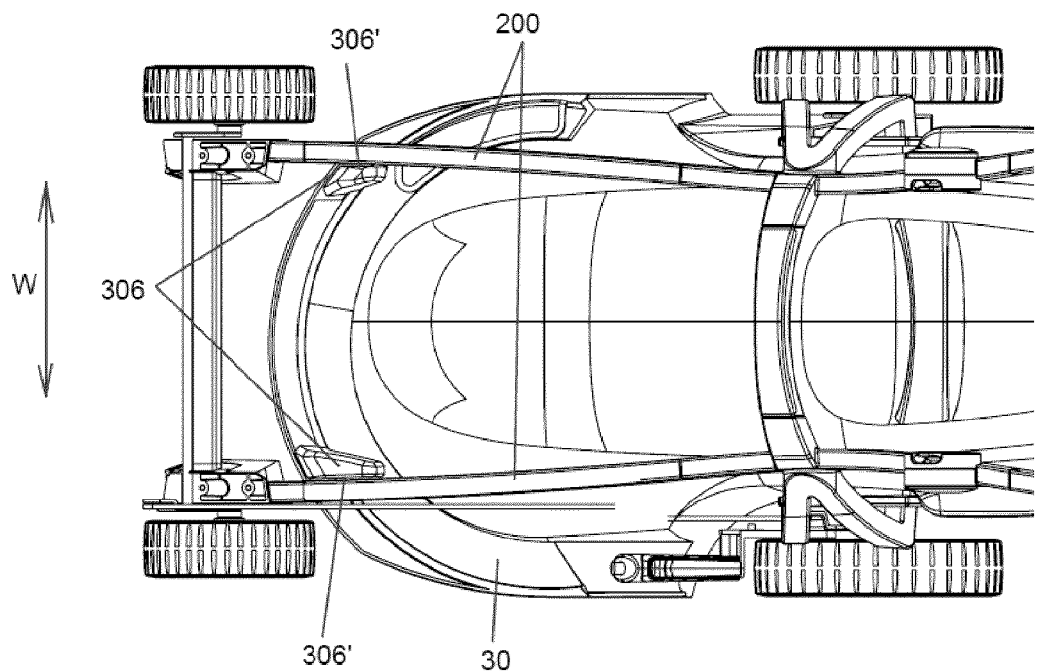

Next referring to FIGS. 5, 6 and 7, a second embodiment of a connection mode between the cutting device 3 and the chassis 2 is illustrated. In these drawings the same reference numeral indicate the same or a corresponding member or component as previously described.

In the embodiment illustrated in FIGS. 5, 6, and 7, a cover 36 for protecting the power source is mounted on the support deck 30 of the power source above the power source; a grass collector 6 is mounted on the support deck 30 and mainly positioned behind the support deck 30. A support lever 212 is arranged between the connecting members 210 on the rear portions 208 of the two side frames 200 of the chassis body. In this embodiment, the connecting means for connecting the support deck 30 to the chassis body 20 includes two connecting projections 306 positioned on the front end of the support deck 30, each of which has an outer side surface 306'. When the support deck 30 and the cover 36 are positioned on the chassis body 20, the support lever 212 on the chassis body comes into contact with a bottom 308 of the support deck 30, and supports the support deck 30 so as to support the cutting device 3. At the same moment, the two projections 306 of the support deck 30 are positioned in the two side frames 200, and the outer side surfaces 306' bear against the internal sides of the two side frame 200 of the chassis body 20 respectively so as to limit the displacement of the support deck 30 and the cover in the width direction W of the lawnmower, thus it ensures the stability of the cutting device in the width direction W. As with the first described embodiment, when the height of the cutting device is adjusted by the adjusting device, the projections of the connecting means for connecting the support deck 30 and the chassis body 20 may move along the side frame of the chassis body.

The person skilled in the art may easily appreciate that the connecting means on the front end of the support deck, connected to the side frame of the chassis body may be configured as other forms or structures. For example, it may also be configured such that when the support deck is positioned on the chassis body, the connecting projections of the front end of the support deck are positioned out of the two side frames, and the internal sides of the projections come into contact with the external sides of the side frames; or the connecting projections of the front end of the support deck may also be designed as hooks so as to hang the support deck of the cutting device onto the side frames of the chassis body; and so on.

Figure 8:
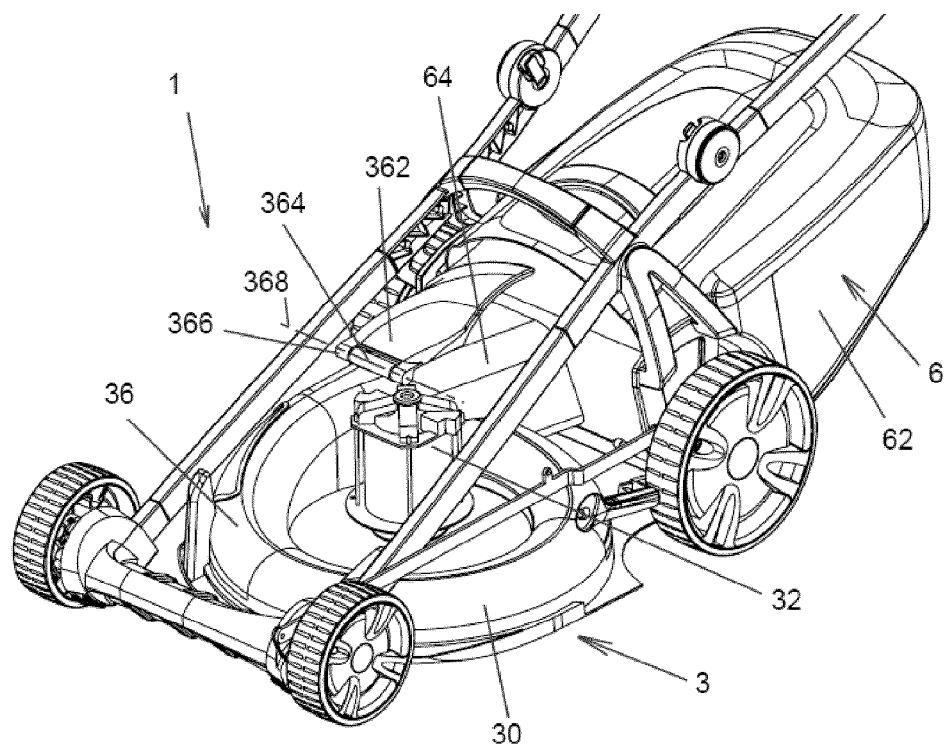
FIG. 8 illustrates a first embodiment of a safety flap of a grass displacing channel of the apparatus in which a grass collector is in communication with the grass displacing channel and the safety flap is in the open position.
Figure 9:
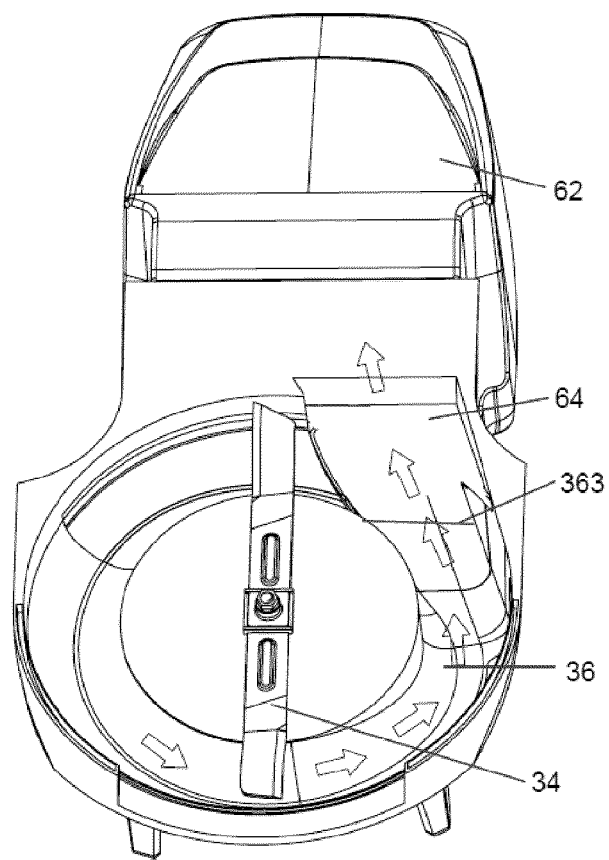
FIG. 9 is a perspective view of the apparatus of FIG. 8 in which the safety flap is in the open position and, for clarity, the chassis of the lawnmower is not shown.
Figure 10:
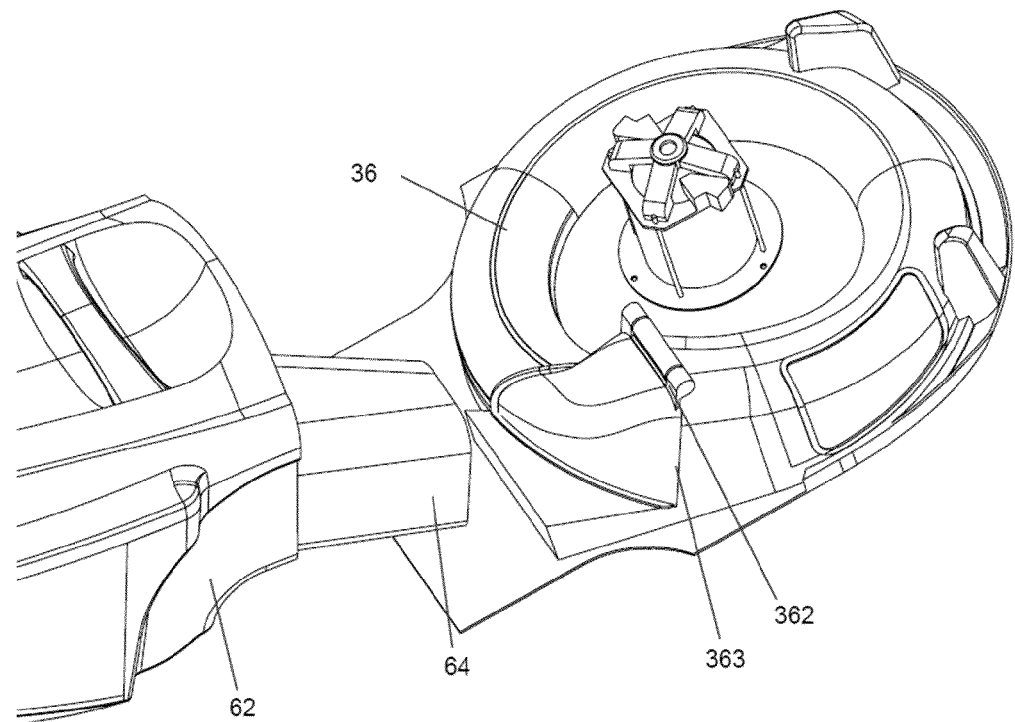
FIG. 10 is perspective view of the apparatus of FIG. 8 in which the grass collector is not in communication with the grass displacing channel and the safety flap is in the closed position and, for clarity, the chassis of the lawnmower is not shown.

Next, a first embodiment of a safety flap of the grass displacing channel of the lawnmower according is illustrated in FIGS. 8, 9, 10 and 11. The grass displacing channel 36 of the support deck 30 of the cutting device 3 of the lawnmower 1 has a grass exit 363, and a safety flap 362 with an adjustable position for switching the grass displacing direction of the grass displacing channel is arranged at the grass exit 363. The safety flap 362 is flat, which includes a connecting portion 364 connected to the pivot connecting seat 366 at the grass exit 363, and may pivot around an axis 368. The safety flap 362 has a closed position (as shown in FIG. 10) and an open position (as shown in FIG. 8). A restoring means, such as spring, a magnetic force component, or the like is arranged between the safety flap 362 and the support deck 30, and preferably, between the connecting portion 364 of the safety flap and the connecting seat 366 of the support deck 30. The restoring means may apply a restoring force to the safety flap 362 to cause the safety flap 362 to tend to move towards the closed position.

Figure 11:
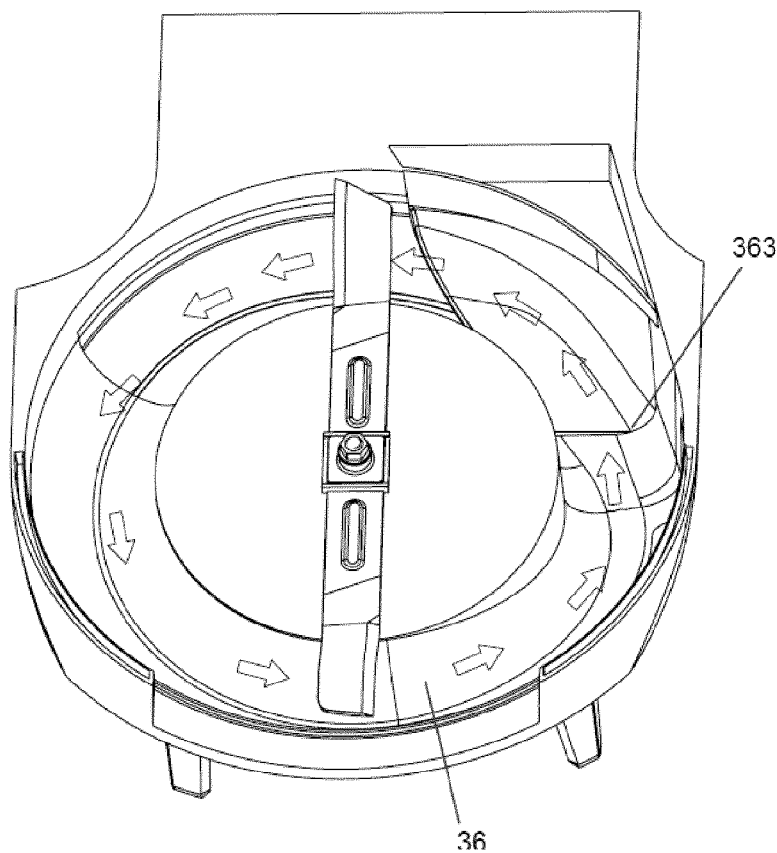
FIG. 11 is a perspective view of the grass displacing channel of the apparatus of FIG. 10 in which the safety flap is in the closed position.
Figure 12:
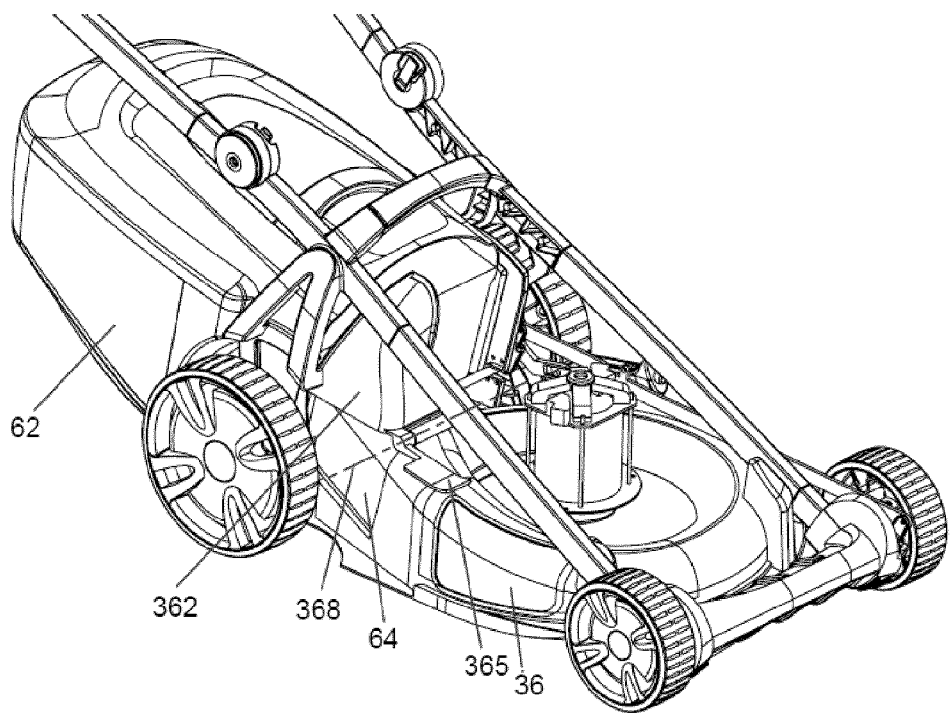
FIGS. 12, 13, 14, 15, 16 illustrate a second embodiment of the safety flap of the grass displacing channel of the apparatus.

As shown in FIGS. 10 and 11, in the case without outer force, a safety flap 36 is in the closed position and covers the grass exit 363 so that the grass displacing channel 36 is closed to form an unblocked internal grass displacing path. The grass cut by the cutting member 34 is caused to flow along the rotating direction of the cutting member in the internal grass displacing path, and further cut into lesser pieces by the cutting member 34 until the pieces of the grass are so little that they fall to the ground. As shown in FIGS. 8 and 9, when the operator pivots the safety flap 362 to the open position and the grass exit 363 is exposed, the grass entrance 64 of the grass collector 6 may be inserted into the grass exit 363 of the grass displacing channel to form an external grass displacing path, and when the grass cut by the cutting member 34 enter into the grass exit 363, the grass is guided into a main body 62 of the grass collector by the grass entrance 64 of the grass collector. The flowing path of the cut grass is indicated by the arrow in FIG. 9. If the grass entrance 64 of the grass collector is pulled out of the grass collector 6, the safety flap 362 may be restored to the closed position automatically under the action of the elastic force of the spring.

Figure 13:
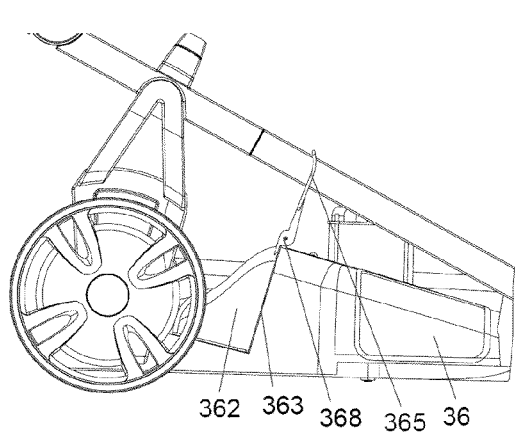
Figure 14:
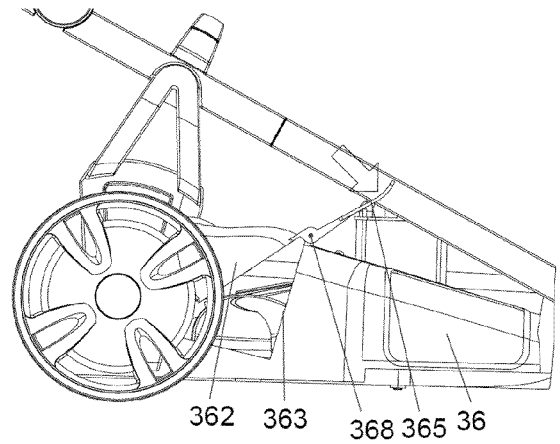
Figure 15:
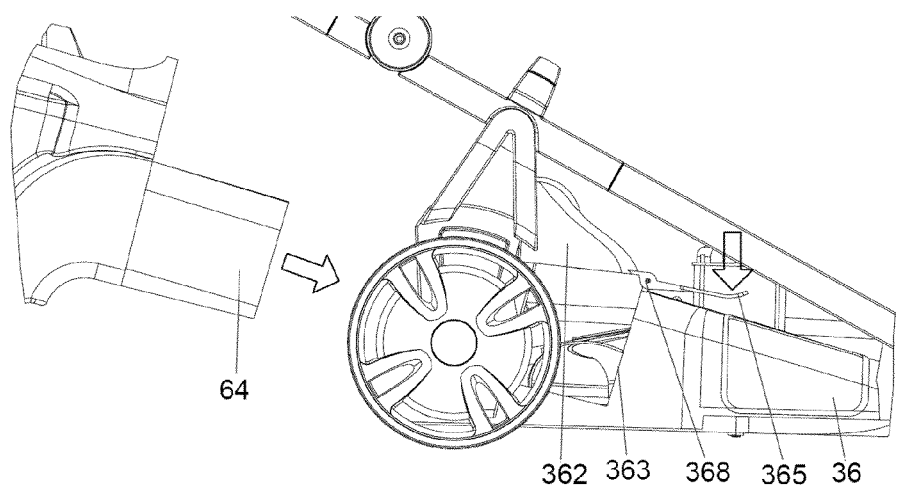
Figure 16:
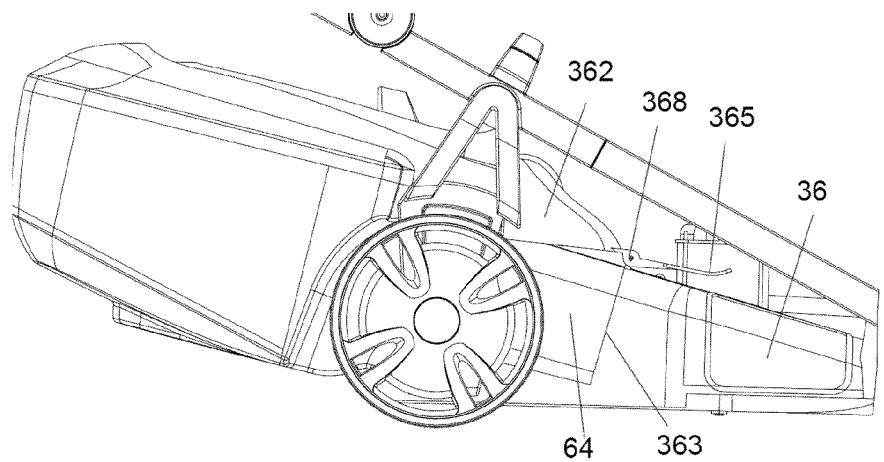

Next, the second embodiment of the safety flap of the grass displacing channel of the lawnmower according to the present invention is illustrated with reference to FIGS. 12, 13, 14, 15 and 16. The difference from the first embodiment of the safety flap of the grass displacing channel is that in the second embodiment, the safety flap 362 is arc-shaped, and a spanner 365 which is convenient for the operator to operate is additionally provided, and the other parts are the same as with the first embodiment. The spanner 365 and the safety flap 362 are fixedly connected or formed integrally so as to ensure that the relative positions of both members are constant. As shown in FIG. 13, the safety flap 362 is in the closed position, and covers the grass exit 363. FIGS. 14 and 15 show that the operator presses the spanner 365 in the direction indicated by the arrow so as to bring the safety flap 362 to rotate around the axis 368, thereby the safety flap 362 is rotated from the closed position to the open position. As shown in FIG. 16, the safety flap 362 is in the open position, and the grass exit 363 is exposed, thus the grass entrance 64 of the grass collector may be easily inserted into the grass exit 363 of the grass displacing channel.

The person skilled in the art may easily appreciate that based on the concept of the present invention, the safety flap of the grass displacing channel may be changed or displaced by other forms or configurations in the other embodiments.

Compared with the prior art, in which an independent cover as an attachment is provided for inserting into or pulling out of the grass exit, a safety flap which may be switched between the closed position and the open position is arranged at the grass exit of the grass displacing channel of the cutting device of the lawnmower in the present invention, thus the switch of the grass displacing direction will become easy, and the safety flap is not easy to lose with regard to an independent attachment.

Figure 17:
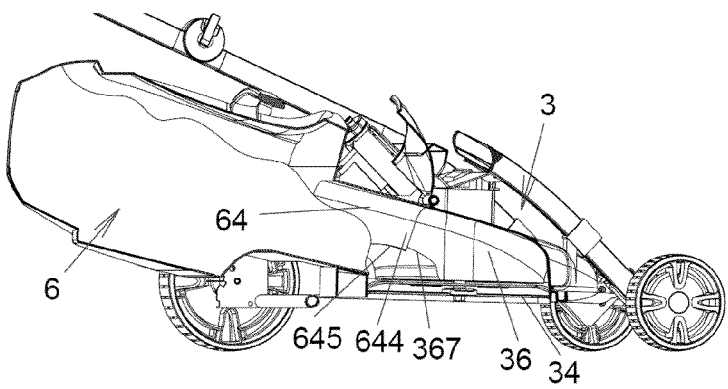
FIGS. 17, 18 and 19 illustrate a counterpart structure between the grass exit of the grass displacing channel and the grass entrance of the grass collector of the apparatus with FIG. 17 showing a beginning edge of the grass displacing channel and a first side of the grass entrance of the grass collector.

Next, the counterpart structure between the grass entrance of the grass collector and the grass exit of the grass displacing channel of the lawnmower is described with reference to FIGS. 17, 18 and 19.

Figure 18:
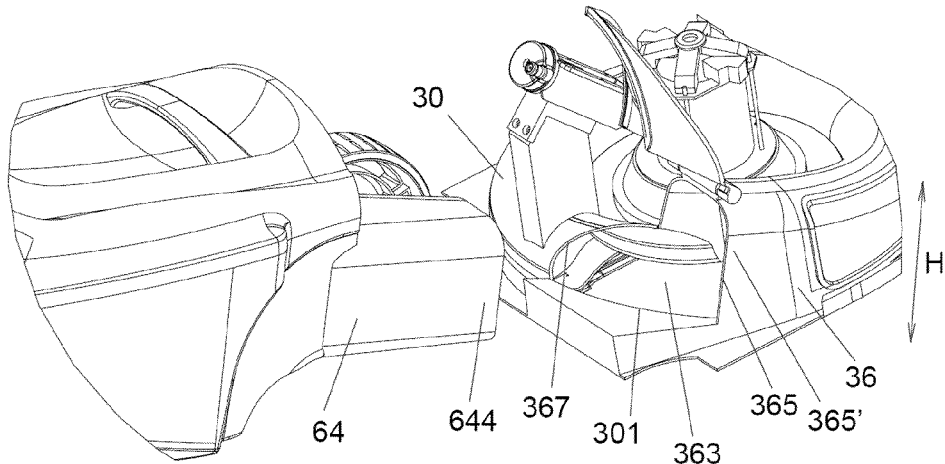
Figure 19:
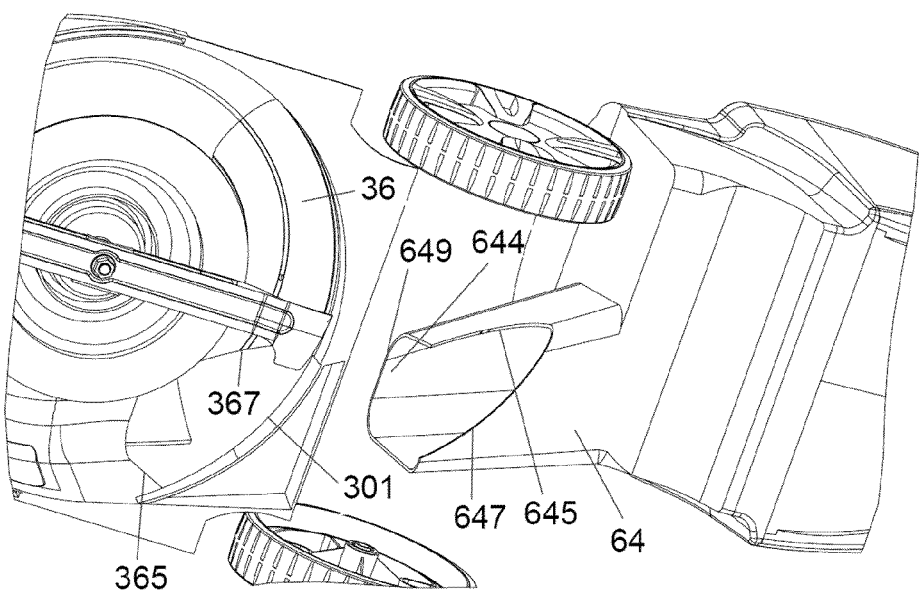

As shown in FIG. 18, the grass displacing channel 36 on the support deck 30 of the cutting device 3 has a beginning edge 367 and a terminating edge 365 which is mainly taller than the edge 367 in the height direction H. The support deck 30 has an inner edge 301 at the grass entrance 363. The beginning edge 367 and the terminating edge 365 of the grass displacing channel 36 and the inner edge 301 of the support deck 30 are connected successively, and form the edge of the grass exit 363 on the support deck 30. As shown in FIG. 19, in order to mate with the grass exit 363, the edge of the grass entrance 64 of the grass collector 6 is formed by a first edge 645, a second edge 647 and a third edge 649 connected successively, wherein the third edge 649 is positioned on the forefront of the grass entrance 64, and the first edge 645 and the second edge 647 extend from the portion connected to the third edge 649 in the direction away from the forefront and interconnect at the end, thereby a gap is formed at the grass entrance 64. The first edge 645 of the grass entrance 64 is mated with the beginning edge 367 of the grass displacing channel 36, that is to say, when a front end 644 of the grass entrance 64 of the grass collector is inserted into the grass exit 363 of the grass displacing channel 36, the edges 645, 367 are connected completely or generally (as shown in FIG. 17). The second edge 647 of the grass entrance 64 is mated with the inner edge 301 of the support deck 30, that is to say, when the front end 644 of the grass entrance 64 of the grass collector is inserted into the grass exit 363 of the grass displacing channel 36, the edges 647, 301 are connected completely or generally. The third edge 649 of the grass entrance 64 is mated with the terminating edge 365 of the grass displacing channel 36, that is to say, when the front end 644 of the grass entrance 64 of the grass collector is inserted into the grass exit 363 of the grass displacing channel 36, the outer surface of the front end 644 of the grass entrance 64 inserted into the grass displacing channel 36 joins with the inner surface of a terminating end 365' of the grass displacing channel at their opposite portions (as shown in FIG. 17). With this arrangement, when the grass entrance of the grass collector is inserted into the grass exit of the grass displacing channel, the cut grass entering into the grass entrance of the grass collector is guided into the grass collector. At the same time, the gap of the grass entrance does not affect the further movement of the cut grass driven by the cutting member in the grass displacing channel when the cut grass is moving in the grass displacing channel and cannot reach the height for entering into the grass entrance of the collector, until the grass reaches the height for entering into the grass entrance of the collector. Then, the cut grass is displaced into the grass collector through the grass entrance of the grass collector, thus the efficiency and effect of the grass collecting may be largely enhanced. If the first edge of the grass entrance of the grass collector cannot be mated with the beginning edge 367 of the grass displacing channel 36 or the second edge 647 of the grass entrance 64 cannot be mated with the inner edge 301 of the support deck 30, either the cut grass moving in the lower portions of the grass displacing channel are stopped by the grass entrance and fall to the ground or the cut grass goes out of the grass displacing channel and falls to the other parts of the lawnmower.

Next, a handle adjusting device 7 of the foldable handle 5 of the lawnmower is described with reference to FIGS. 20-30.

The lawnmower 1 also comprises a foldable handle 5 with a handle body 51 extending substantially along the width direction of the lawnmower and handle connecting portions 53 pivotally connected to the chassis 2 around the axis B. Preferably, the handle connecting portions 53 extend from the two ends of the handle body 51 respectively and are pivotally connected to the rear ends 208 of the side frame 200 of the chassis 2 around the axis B. In other embodiments, the handle connecting portions may be configured with other shapes or structures, and may also be pivotally connected to other parts of the chassis.

Figure 20:
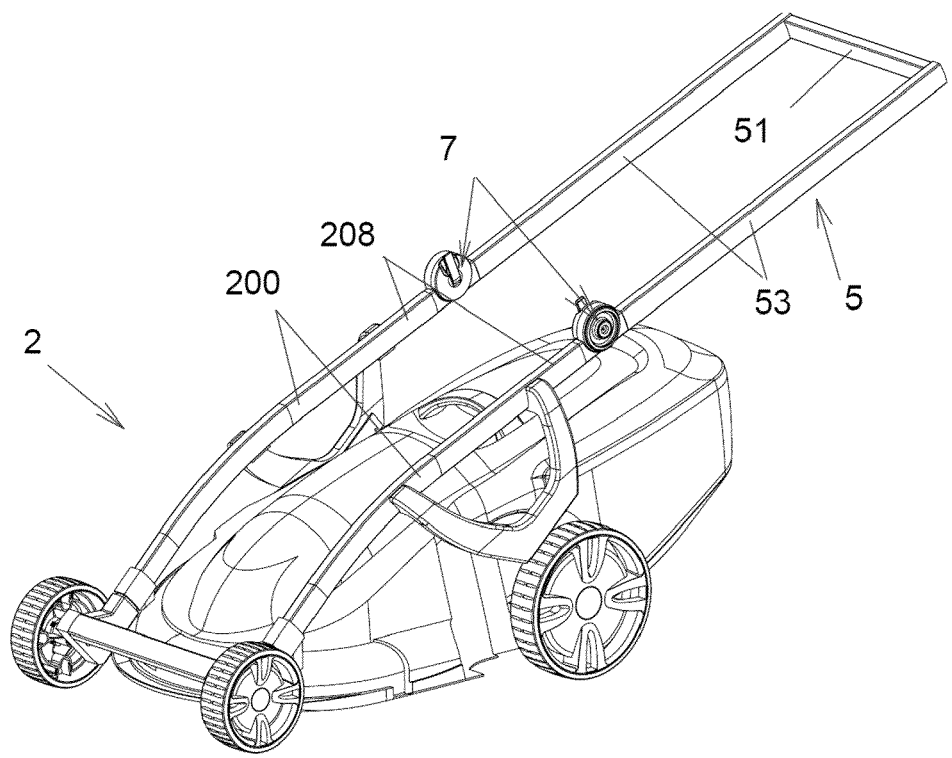
FIG. 20 illustrate a foldable handle of the apparatus and an adjusting device thereof in which the handle of the lawnmower is in the unfolded position.
Figure 21:
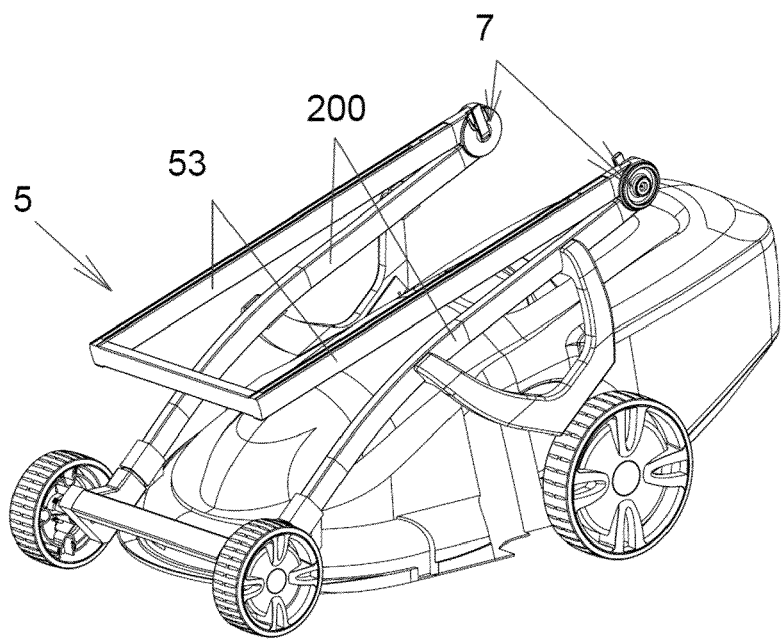
FIG. 21 illustrates the handle of the apparatus in the folded position.
Figure 22:
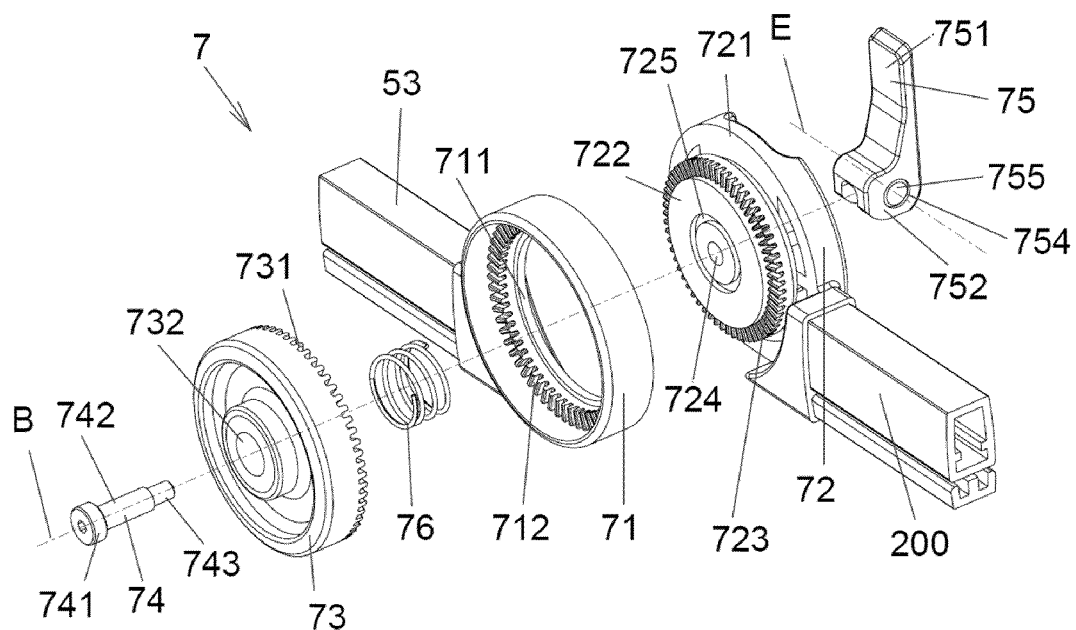
FIG. 22 is an exploded view showing a first embodiment of the handle adjusting device of the apparatus.

A handle adjusting device 7 is arranged at the joint between the handle connecting portion 53 and the chassis 2 in order to facilitate the adjustment of the position of the handle 5 with regard to the chassis 2, and to locate it in the unfolded position (as shown in FIG. 20) or in the folded position (as shown in FIG. 21) or in a position between the unfolded position and the folded position. Preferably, one handle adjusting device is arranged between each handle connecting portion 53 and the chassis 2. The person skilled in the art may easily appreciate that only one handle adjusting device may be provided between the handle connecting portions and the chassis. In the other embodiments, the handle adjusting device of the present invention may also be arranged between the handle and the other parts of the lawnmower when the handle of the lawnmower is connected to the other parts of the lawnmower except for the chassis.

Figure 23:
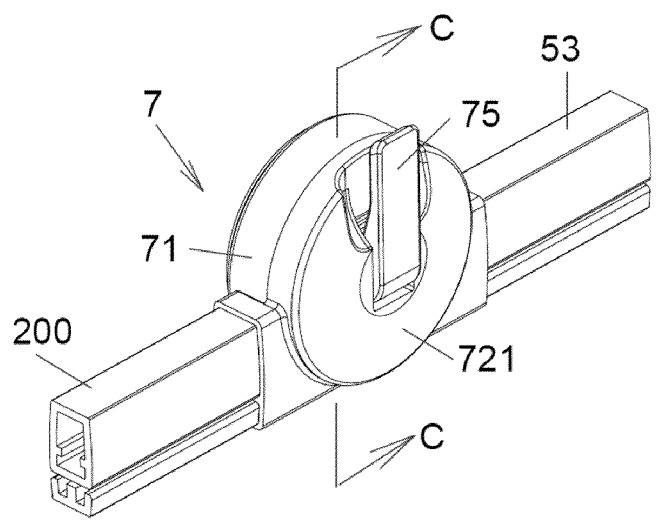
FIG. 23 is a perspective view of the handle adjusting device of FIG. 22 in which the actuating lever is in the locked position.
Figure 24:
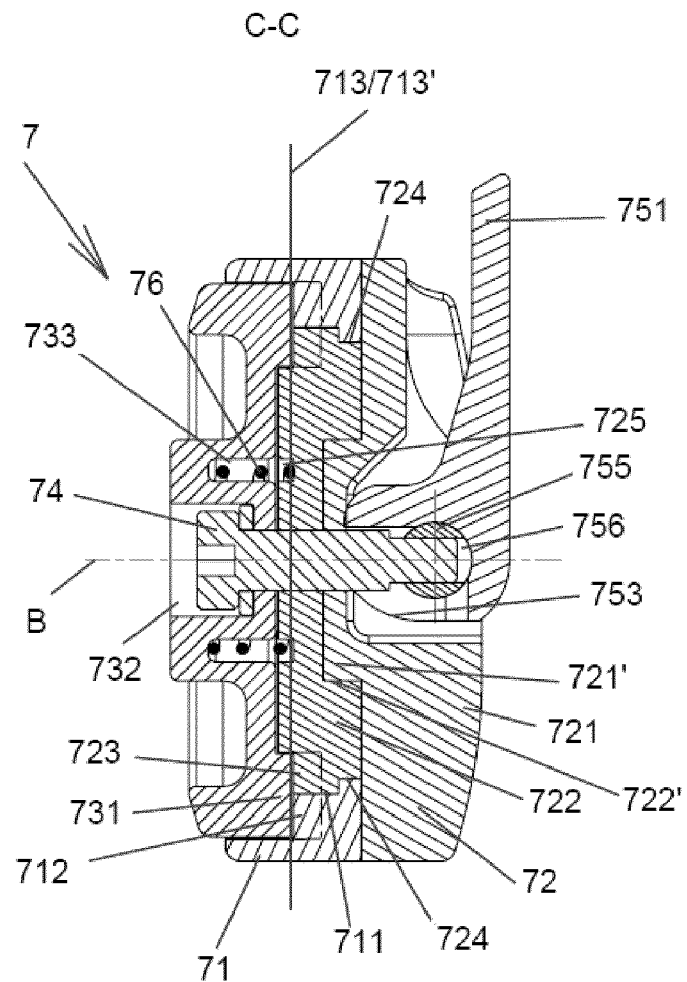
FIG. 24 is a sectional view of the handle adjusting device of FIG. 23 taken along line C-C thereof.
Figure 25:
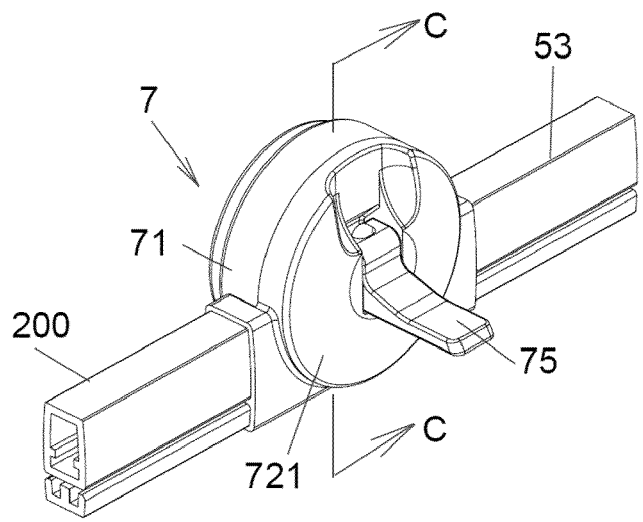
FIG. 25 is a perspective view of the handle adjusting device of FIG. 22 in which the actuating lever is in the unlocked position.

As shown in FIGS. 22-27, the handle adjusting device 7 of the lawnmower according to the first embodiment of the present invention includes a first body 71 connected to the handle connecting portion 53, a second body 72 connected to one side frame 200 of the chassis 2, a locking member 73 and a locking driving member 75, wherein the central axes (which are indicated by axes B) of the first body 71, the second body 72 and the locking member 73 are coincident. Preferably, the first body 71 is an annular member with an inner stepped cylindrical opening 711 and a central axis B. The first body 71 has a stepped section in the radial direction (as shown in FIG. 25) and includes a first engaging portion 712. The first engaging portion 712 includes multiple reference teeth along the radial direction around the axis B. The outer end of each reference tooth is positioned in a first plane 713, and the angle interval between the two adjacent reference teeth is 5 degrees, and may be other degrees in the other embodiments. The second body 72 includes a cover 721 and an engaging member 722 fixedly connected to the cover 721. A second engaging portion 723 having multiple reference teeth along the radial direction around the axis B is provided at one end of the engaging member 722. The outer end of each reference tooth is positioned in a second plane 713'. Preferably, the angle interval between the two adjacent teeth of the engaging member 722 is the same with that of the first engaging portion 712. The engaging member 722 is provided with an inner opening 722' and a groove 724 in the outer circumference at the other end thereof, and the cover 721 is provided with a projection 721' at one end.

Figure 26:
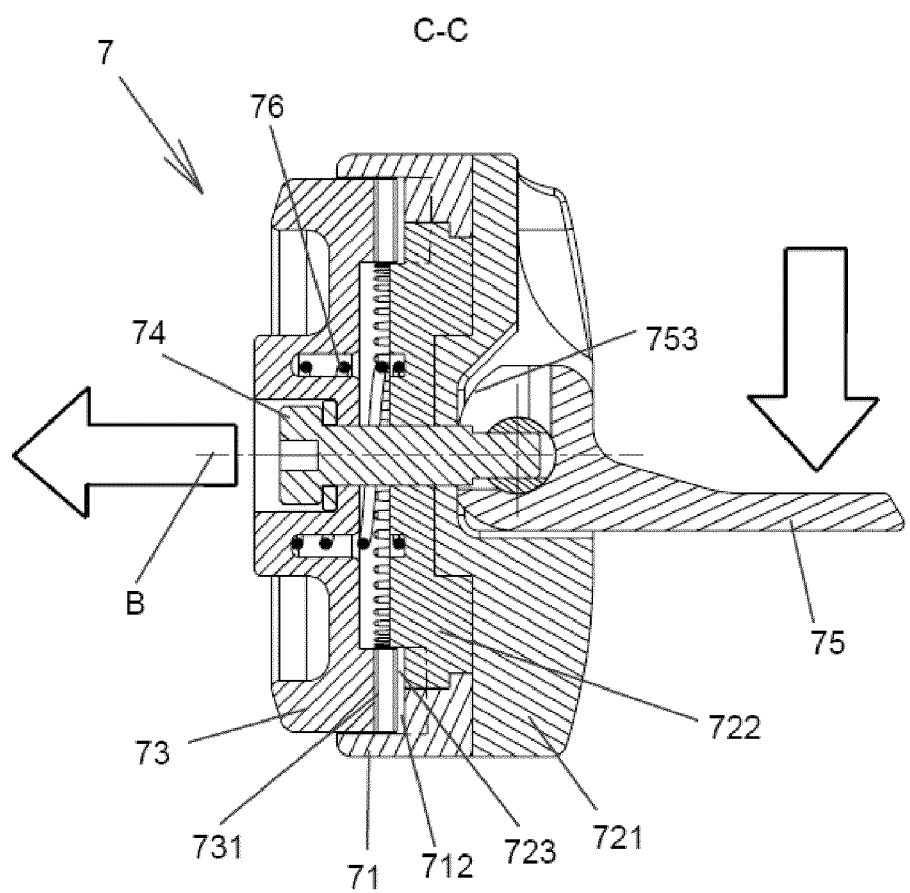
FIG. 26 is a sectional view of the handle adjusting device of FIG. 25 taken along line C-C thereof.

As shown in FIGS. 24 and 26, when assembled, the reference teeth of the first engaging portion 712 and the second engaging portion 723 are open towards the same direction, and then the engaging member 722 is inserted into the inner stepped cylindrical opening 711 of the first body so that the portion of the first body 71 with the smallest radius is blocked in the groove 724 of the engaging member 722. Next, the projection 721' of the cover 721 of the second body 72 is inserted into the inner opening 722' of the engaging member 722, and the projection 721' and the inner opening 722' are adaptable in shape and mated closely, thereby the first body 71 is clipped between the engaging member 722 and the cover 721 of the second body 72, and the first body 71 may rotate around the axis B with regard to the second body 72, and now the outer surface 713 of the first engaging portion 712 and the outer surface 713' of the reference teeth of the second engaging portion 723 are coplanar. With the pivot connection between the first body 71 and the second body 72 around the axis B, the handle 5 is pivotally connected to the chassis 2 around the axis B. An annular groove 725 for accommodating one end of a restoring spring 76 is arranged on the end of the engaging member 722.

One end of the locking member 73 is provided with a third engaging portion 731 toward the first and second engaging portions and an annular groove 733 for accommodating the other end of the restoring spring 76. The locking member 73 also has a stepped opening 732 along the direction of the central axis B. The portion of the stepped opening 732 with a larger radius is adjacent to the foregoing end of the locking member 73, and the portion of the stepped opening 732 with a smaller radius is adjacent to the other end of the locking member 73. The engaging member 722 and the cover 721 of the second body both have an opening with an axis B as the central axis. The opening forms the opening 724 of the second body 72 when the engaging member 722 is fastened to the cover 721.

A connecting shaft 74 has a head portion 741 which is stopped by the step of the stepped opening 732, a body portion 742 which extends through the stepped opening 732 of the locking member 73 and the opening 724 of the second body 72, and an end portion 743 which is extending out of the opening 724. A locking driving member 75 includes an operating portion 751 for the operator to operate, and a driving portion 752 which may bring the locking member 73 to move between a locked position (as shown in FIG. 24) and an unlocked position (as shown in FIG. 26) along the direction of the axis B. The locking driving member 75 has a cylindrical opening 754 with an axis E perpendicular to the axis B adjacent to the driving portion 752. A cylindrical pin 755 is mounted into the cylindrical opening 754 and has the same axis with the cylindrical opening 754. The middle portion of the pin 755 has a connecting opening 756 to which the end portion 743 of the connecting shaft 74 is fixedly connected by a tight fit, thus the locking member 73 is pivotally connected around the axis B with regard to the first body 71 and the second body 72. The locking driving member 75 may rotate around the axis E. The storing spring 76 surrounds the connecting shaft 74 between the locking member 73 and the first body 71, and applies forces with different directions to the locking member 73 and the first body 71, thus they tend to move away from each other. In the other embodiments, the connecting shaft 74 may be fixedly connected to or formed integrally with the locking member 73.

The driving portion 752 of the locking driving member 75 has an eccentric driving plane 753 around the axis B. As shown in FIG. 24, when the locking driving member 75 is in the locked position, the portion of the driving plane 753 of the driving portion 752 away from the axis B bears against the surface of another end of the cover 721 of the second body 72, thereby the head portion 741 of the connecting shaft 74 forces the locking member 73 to be located in the locked position along the axis B. Thus, the reference teeth of the third engaging portion 731 of the locking member 73, the first engaging portion 712 of the first body 71 and the second engaging portion 723 of the second body 72 are engaged with each other, thereby the relative positions between the first body 71 and the second body 72 are locked.

As shown in FIG. 26, when the locking driving member 75 is in the unlocked position, the portion of the driving plane 753 of the driving portion 752 adjacent to the axis B bears against the surface of another end of the cover 721 of the second body 72, and the locking member 73 is moved to the unlocked position along the axis B towards the direction away from the first body 71 and the second body 72 along the axis B under the action of the restoring spring 76. At that moment, the reference teeth of the third engaging portion 731 of the locking member, the first engaging portion 712 of the first body and the second engaging portion 723 of the second body 72 are disengaged with each other, thereby the first body 71 and the second body 72 may rotate oppositely around the axis B so as to adjust the position of the handle connecting portion 53 with regard to the side frame 200 of the chassis. In the other embodiments, as a restoring means, the restoring spring may be replaced by other devices, such as magnetic force components.

Figure 27:
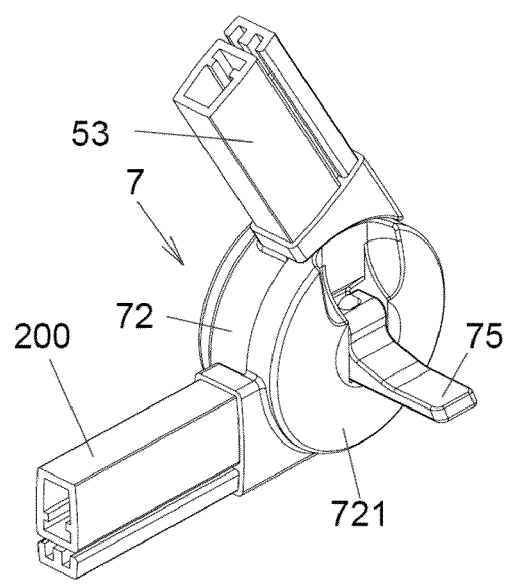
FIG. 27 is a perspective view of the handle adjusting device of FIG. 22 in which the actuating lever is in the unlocked position and the handle is adjusted to a new position between the unfolded position and the folded position.

Next is described the adjusting operation process of the position of the handle with regard to the chassis. As shown in FIG. 23, the handle is in the unfolded position, and the locking driving member 75 is in the locked position, and the locking member 73 is in the locked position (as shown in FIG. 24) along the axis B. As shown in FIG. 25, the locking driving member 75 is pressed down to rotate around the axis E to the unlocked position, and the locking member is in the unlocked position (as shown in FIG. 6) along the axis B. When the handle connecting portion 53 is rotated with regard to the side frame 200 of the chassis around the axis B to a certain position (as shown in FIG. 27) and the locking driving member 75 is pushed upwards to its locked position, the locking member 73 is located in the locked position along the axis B, thus the positions of the first body 71 and the second body 72 are fixed, thereby the position of the handle with regard to the chassis is fixed. FIG. 27 shows a certain position between the unfolded position and the folded position of the handle. It may be easily understood that the operator may adjust and fix the handle to the unfolded position or the folded position or any position between the unfolded position and the folded position with regard to the chassis through the handle adjusting device 7 described herein.

Preferably, the reference teeth of the first, second and third engaging portions have the same angle internal between each two reference teeth, that is to say, the number of the reference teeth is the same. In the other embodiments, the reference teeth of the first, second and third engaging portions may have different angle internal between each two reference teeth, that is to say, the number of the reference teeth is not the same.

Figure 28:
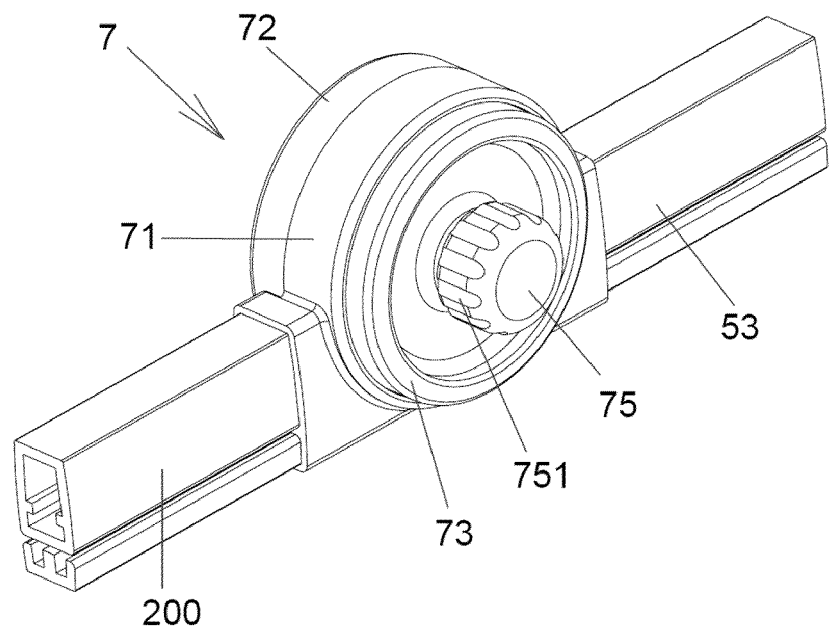
FIG. 28 illustrates a second embodiment of the handle adjusting device of the apparatus.
Figure 29:
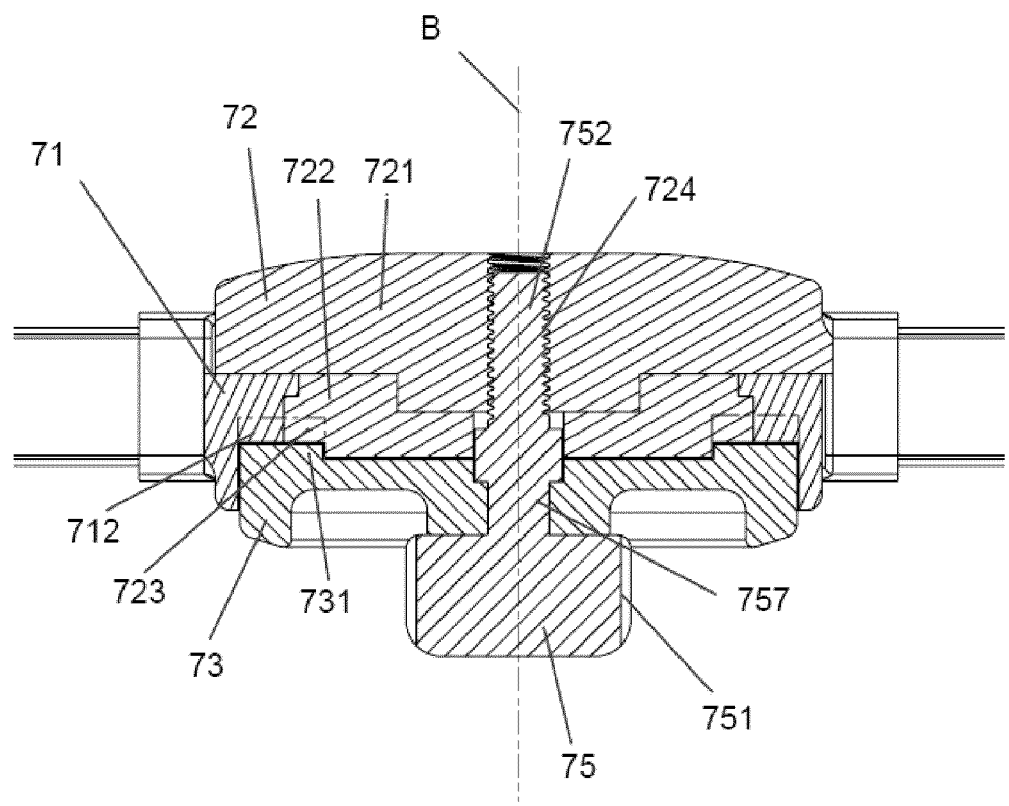
FIG. 29 is a sectional view of the handle adjusting device of FIG. 28 taken along line D-D thereof in which the locking member is in the locked position.
Figure 30:
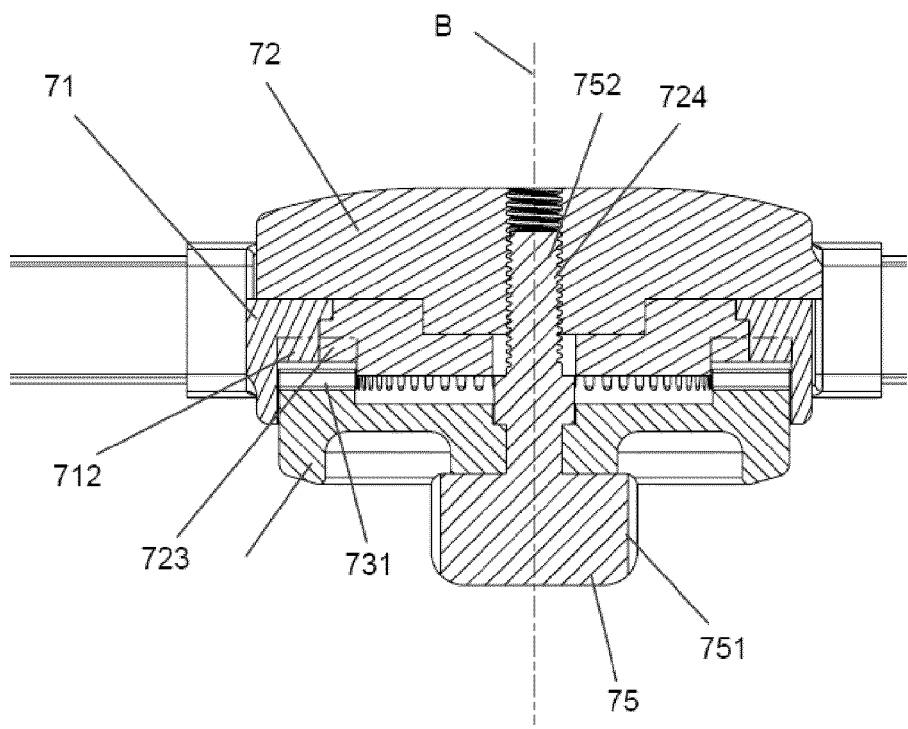
FIG. 30 is a sectional view of the handle adjusting device of FIG. 28 taken along line D-D thereof in which the locking member is in the unlocked position.
Figure 31:
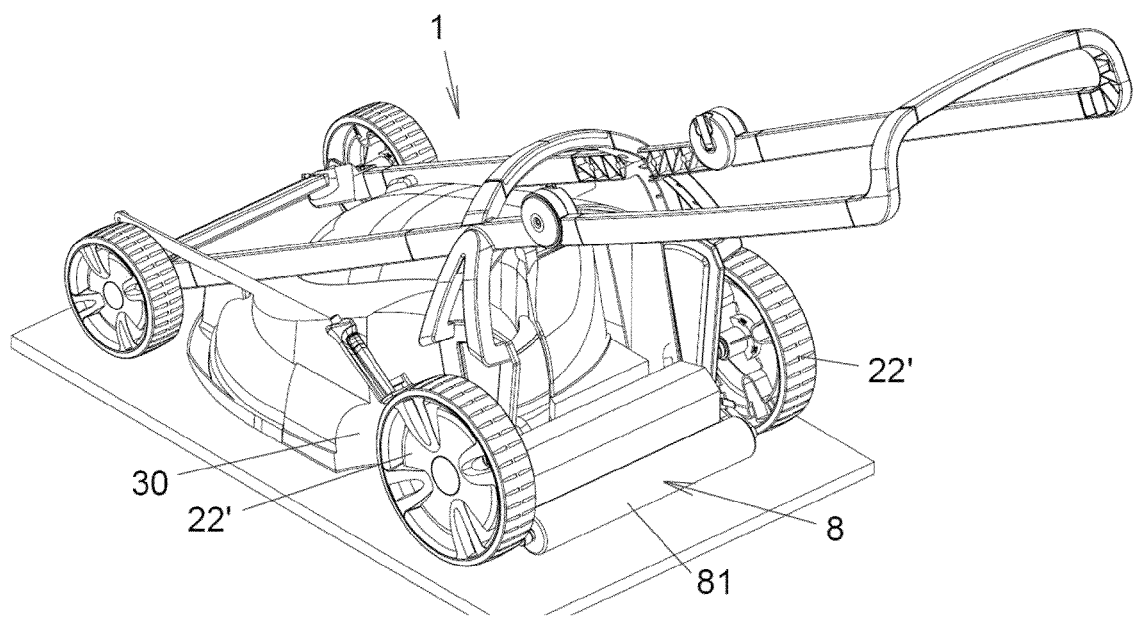
FIG. 31 illustrates an adjustable roller device of the apparatus.
Figure 32:
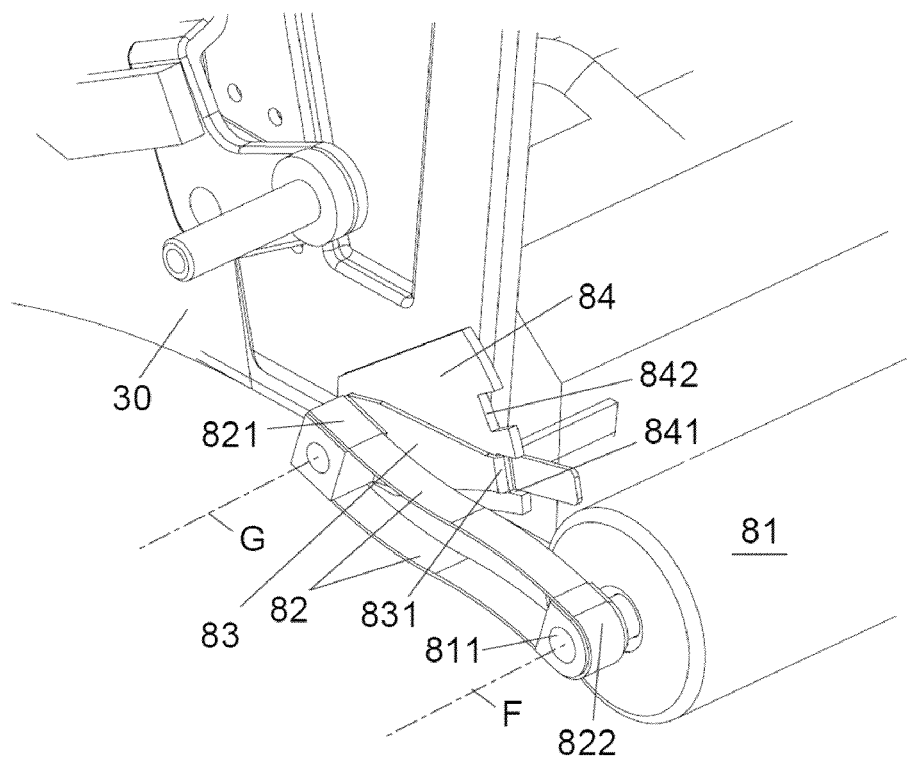
FIG. 32 illustrates an adjusting member of the roller device of the apparatus in a first position.

FIGS. 28-30 illustrates a second embodiment of the handle adjusting device wherein the handle adjusting device 7 includes a first body 71, a second body 72, a locking member 73 and a locking driving member 75. The device differs from the previously described device in that the handle connecting portion 53 is connected to the second body 72 and the side frame 200 of the chassis is connected to the first body 71; the locking driving member 71 has a configuration different from the locking driving member previously described and serves as a connecting shaft; the opening 724 of the second body is a threaded opening; and the restoring spring is omitted. In the second described embodiment of the handle adjusting device, the locking driving member 75 includes an operating portion 751 for the operator to rotate around the axis B, a connecting neck portion 757 for supporting the locking member 73, and a driving portion 752 taking the form of a screw along the axis B. The external threads of the driving portion 752 are mated with the internal threads of the opening 724 of the second body 72, thus the locking member 73, the first body 71 and the second body 72 are pivotally connected around the axis B.

By rotating the locking driving member 75, the operator may move the locking member 73 toward the first body 71 and the second body 72 along the axis B to its locked position (as shown in FIG. 29) along the axis B, or move the locking member 73 toward the direction away from the first body 71 and the second body 72 along the axis B to its unlocked position (as shown in FIG. 30) along the axis B. In the locked position of the locking member 73, the third engaging portion 731 of the locking member is engaged with the first engaging portion 712 of the first body and the second engaging portion 723 of the second body 72, thus the relative positions of the first body and the second body are fixed. In the unlocked position of the locking member 73, the third engaging portion 731 of the locking member is disengaged with the first engaging portion 712 of the first body and the second engaging portion 723 of the second body 72, thus the operator may change the relative positions of the first body 71 and the second body 72.

The person skilled in the art may easily appreciate that the components in the handle adjusting device of the lawnmower may be configured with other forms or constructions, and not be limited to the constructions described in the first and second embodiments. Moreover, the handle adjusting device may be replaced or change by other forms without departing the scope of the idea of the invention.

With the handle adjusting device arranged between the handle and the chassis of the lawnmower or the other parts, the operator may easily adjust the height of the handling portion of the handle to improve the ergonomics thereof, or the operator may easily switch the handle to the folded position so as to facilitate carrying or storing the apparatus. Additionally, the folded handle may also be used to carry other objects.

Next, an adjustable roller device 8 of the lawnmower 1 is described with reference to FIGS. 31-36.

The roller device 8 is mounted on the rear portion of the lawnmower 1 adjacent to the rear wheel 22'. The roller device 8 includes a roller 81 which is generally an elongated cylindrical member, mounted on a pivot shaft 811, which rotates around a central axis F that is extending along the width direction of the lawnmower. The roller device 8 may also include an elastic connecting means 82 which is preferably composed of two parallel spring steel strip, an adjusting member 83, and a restricting support 84. The elastic connecting means 82 is pivotally connected to the support deck 30 of the cutting device 3 around an axis parallel to the axis F at one end 821, and pivotally connected to the roller 81 around the axis F at the other end 822. The restricting support 84 is fixedly connected to the support deck 30 of the cutting device 3, and has a first restricting member 841 and a second restricting member 842, which may preferably be grooves. The adjusting member 83 is fixedly connected to one end 821 of the elastic connecting means 82, and has a locking portion 831, thus the adjusting member 83 may pivot around an axis G with regard to the restricting support 84, and be restricted to one of the first position and the second position. By changing the position of the adjusting member 83 with regard to the restricting support 84 fixedly connected to the support deck 30, the elastic connecting means 82 may bring the roller to switch between a suspended position and a non-suspended position. The suspended position and a non-suspended position here are defined with regard to the cutting device 3 located in the minimum cutting height.

Figure 33:
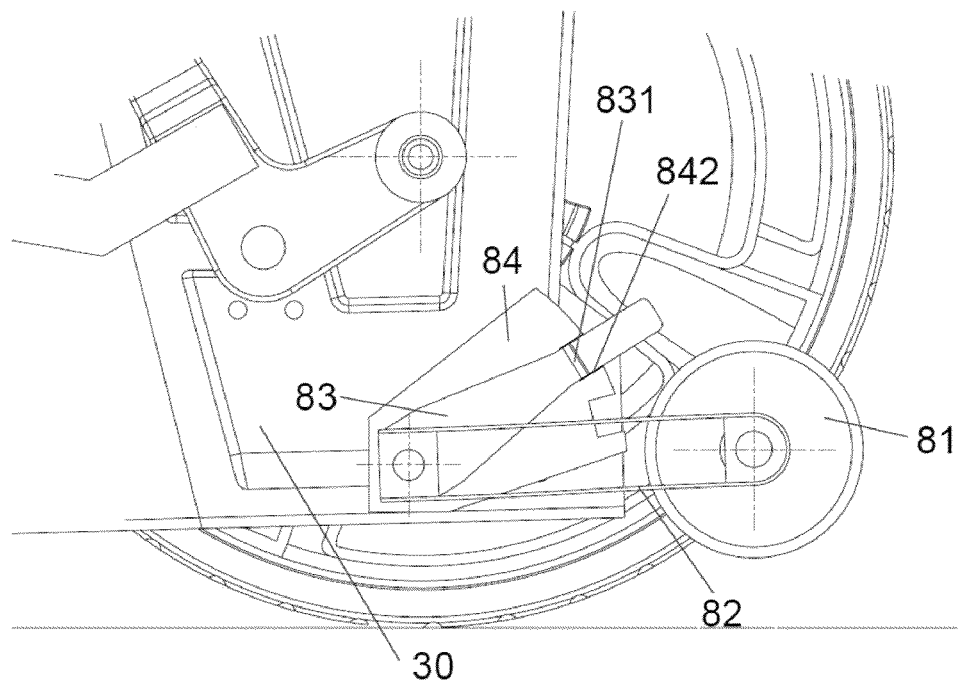
FIG. 33 illustrates the adjusting member of the roller device of the apparatus in a second position.

As shown in FIG. 33, in the second position of the adjusting member 83, the locking portion 831 of the adjusting member 83 is mated with the second restricting member 842 of the restricting support 84, thus the elastic connecting means 82 may support the roller 81 so that the roller 81 is in the suspended position and is spaced from the surface to be mowed.

Figure 34:
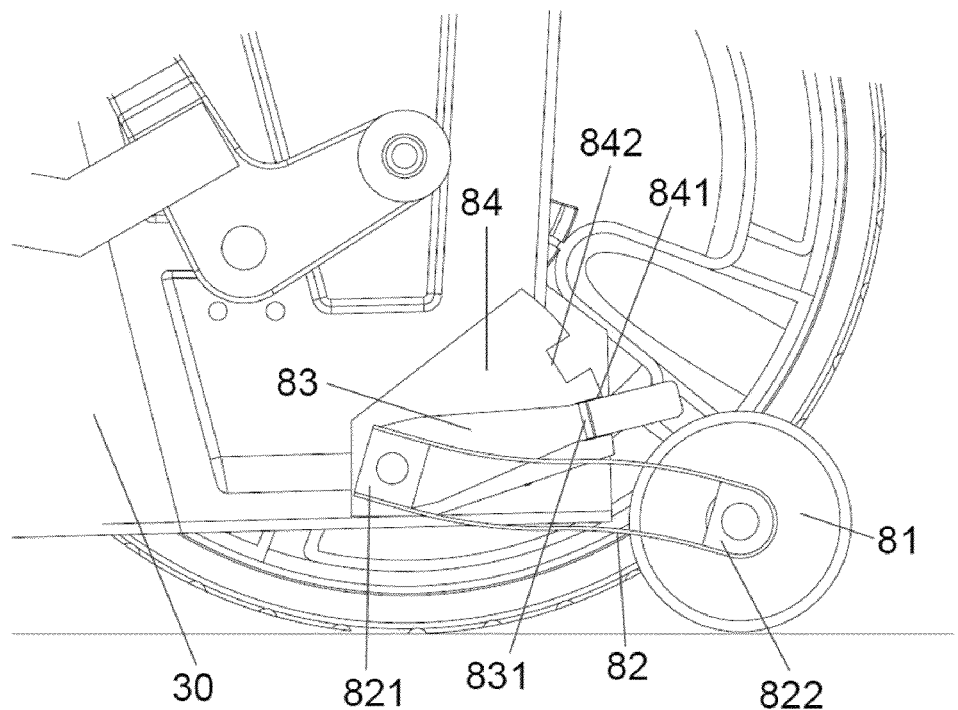
FIG. 34 illustrates the adjusting member of the roller device of the apparatus in the first position with the cutting device being set at a minimum cutting height.

As shown in FIG. 34, the locking portion 831 of the adjusting member 83 is mated with the first restricting member 841 of the restricting deck 84. When the cutting device 3 is in the minimum cutting height, the distance between one end 821 of the elastic connecting means 82 and the surface to be mowed is smallest. Moreover, the roller 81 on the other end 822 is in the non-suspended position and comes into contact with the surface to be mowed and the elastic connecting means 82 is deformed in some degree due to the weight stress of the lawn mower.

Figure 35:
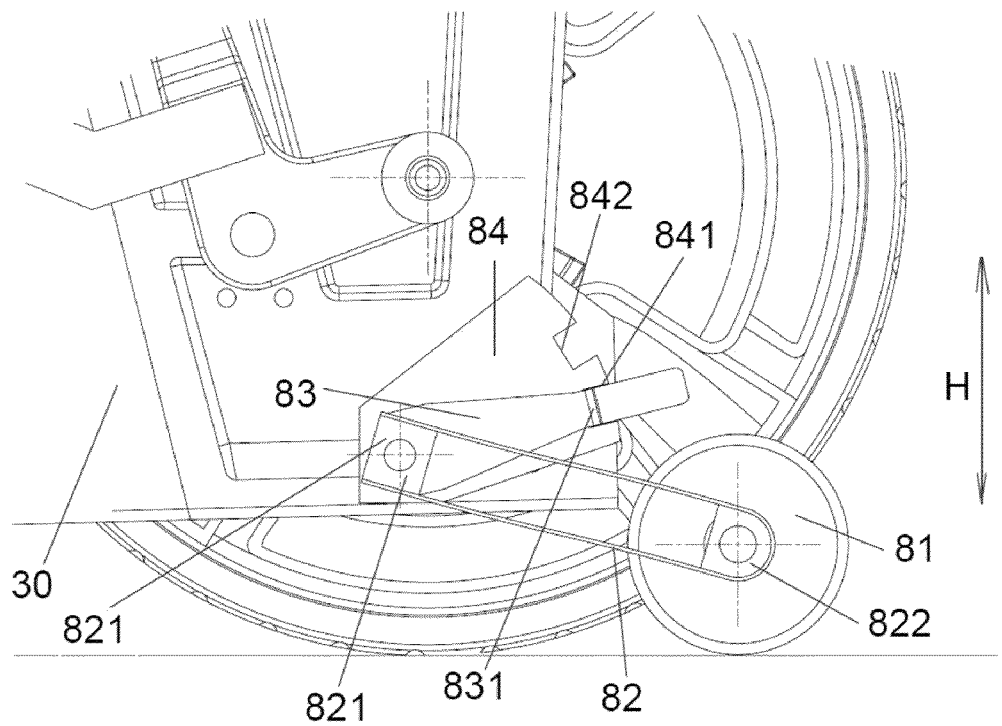
FIG. 35 illustrates the adjusting member of the roller device of the apparatus in the first position with the cutting device being set at a second cutting height.

As shown in FIG. 35, in the first position of the adjusting device 83, when the support deck 30 is adjusted so that the cutting device 3 is located in a second cutting height taller than the minimum cutting height, the distance between the end 821 of the elastic connecting means 82 and the surface for placing the lawnmower becomes larger and the roller 81 on the other end 822 is still engaged with the surface to be mowed. But, in this position, the deformation of the elastic connecting means is reduced or no deformation is formed.

Figure 36:
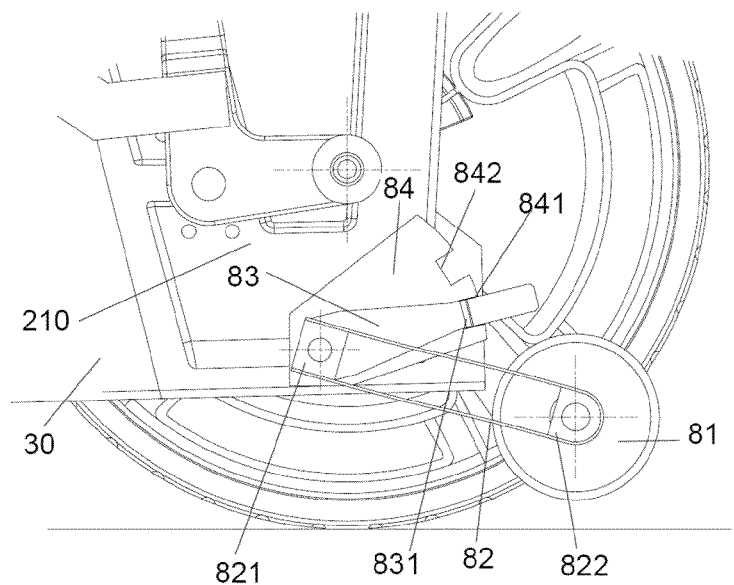
FIG. 36 illustrates the adjusting member of the roller device of the apparatus in the first position with the cutting device being set at a maximum cutting height.

As shown in FIG. 36, in the first position of the adjusting member 83, when the support deck 30 is adjusted so that the cutting device 3 is located in a third cutting height (the maximum cutting height) much taller than the second cutting height, the distance between the end 821 of the elastic connecting means 82 and the surface for placing the lawnmower is larger, and even the roller 81 on the other end 822 is disengaged with the surface to be mowed.

With the adjustable roller device of the lawnmower, the operator may adjust the position of the roller according to the work conditions and personal requirements.

The detailed embodiments described above are intended to illuminate the concepts and principles of the present invention, rather than limit the scope of the invention. It can be easily understood for those skilled in the art that many other modifications and variations of these preferred embodiments will be apparent and may be made without departing from the spirit and the scope of the invention.

What is claimed is:

1. An apparatus for caring for a lawn, comprising:
a cutting device comprising a support deck supporting a power source, a motor, and a cutting blade, the cutting device further comprising a sleeve for mounting the cutting device;
a chassis for slidably receiving the sleeve and for carrying the cutting device above the lawn, the chassis defining a longitudinal axis and including a chassis body and wheels mounted on the chassis body; and
an adjusting device for adjusting the height of the cutting device with respect to the chassis, which is arranged between the cutting device and the chassis;
wherein the adjusting device comprises an adjusting seat connected to one of the chassis body and the cutting device, an adjustment driving device mounted on the adjusting seat, a driving member connected to the adjustment driving device, and a driven member connected to the driving member, wherein the driven member is connected to the other one of the chassis body and the cutting device,
wherein actuation of the adjustment device causes the sleeve of the cutting device to slide relative to the chassis along the longitudinal axis of the chassis, thereby changing the distance between the cutting device and the lawn.

2. The apparatus as recited in claim 1, wherein the adjustment driving device comprises a motor.

3. The apparatus as recited in claim 2, wherein one of the driving member and the driven member has an internal threaded hole and the other one thereof has external threads which may be engaged with the threads of the internal threaded hole.

4. The apparatus as recited in claim 3, wherein the chassis body includes two side frames and a connecting rod for connecting the two side frames and one of the adjusting seat and the driven member is connected to the connecting rod of the chassis body.

5. The apparatus as recited in claim 1, wherein the driven member has a guide external surface and the adjusting seat has a guide internal surface which is arranged to contact with the guide external surface.

6. The apparatus as recited in claim 5, wherein the driving member has an axis, one of the guide external surface and the guide internal surface extends along a direction parallel to the axis.

7. The apparatus as recited in claim 1, wherein the driving member has an axis and the chassis body includes two side frames, wherein at least a portion of the surface of each side frame extends along a direction parallel to the axis of the driving member, and wherein the support deck is slidably connected to the portion of the surface of each side frame.

8. The apparatus as recited in claim 7, wherein each side frame of the chassis body includes a front portion and a rear portion onto which the wheels are mounted respectively, and a middle portion releasably connected to the front portion, to which the cutting device is slidably connected.

9. The apparatus as recited in claim 8, wherein the chassis body also includes at least one connecting rod for connecting the two side frames together.

10. The apparatus as recited in claim 9, wherein the chassis body includes two connecting rods for connecting the two side frames together and wherein one connecting rod is used as a front rod connected to the front portions of the side frames and the other connecting rod is used as a rear rod connected to the rear portions of the side frames.

* * * * *